US012273818B2

(12) United States Patent
Uno et al.

(10) Patent No.: US 12,273,818 B2
(45) Date of Patent: Apr. 8, 2025

(54) COMMUNICATION DEVICE, COMMUNICATION METHOD, AND COMMUNICATION SYSTEM

(71) Applicant: SONY SEMICONDUCTOR SOLUTIONS CORPORATION, Kanagawa (JP)

(72) Inventors: Masahiro Uno, Kanagawa (JP); Osamu Kozakai, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 423 days.

(21) Appl. No.: 17/639,733

(22) PCT Filed: Jul. 15, 2020

(86) PCT No.: PCT/JP2020/027440
§ 371 (c)(1),
(2) Date: Mar. 2, 2022

(87) PCT Pub. No.: WO2021/049162
PCT Pub. Date: Mar. 18, 2021

(65) Prior Publication Data
US 2022/0295409 A1 Sep. 15, 2022

(30) Foreign Application Priority Data
Sep. 12, 2019 (JP) .................... 2019-165936

(51) Int. Cl.
*H04W 52/02* (2009.01)
*H04W 74/0833* (2024.01)

(52) U.S. Cl.
CPC ... *H04W 52/0251* (2013.01); *H04W 74/0833* (2013.01)

(58) Field of Classification Search
CPC ............ H04W 52/0251; H04W 52/24; H04W 74/0833; Y02D 30/70; H04L 27/26
See application file for complete search history.

(56) References Cited

U.S. PATENT DOCUMENTS

2013/0035084 A1* 2/2013 Song ................. H04W 52/48
455/418
2016/0119770 A1* 4/2016 Ryu ...................... G01S 1/00
370/328

(Continued)

FOREIGN PATENT DOCUMENTS

JP 2014-524690 A 9/2014
JP 2018-511236 A 4/2018

(Continued)

OTHER PUBLICATIONS

International Search Report and Written Opinion of PCT Application No. PCT/JP2020/027440, issued on Oct. 20, 2020, 09 pages of ISRWO.

*Primary Examiner* — Farid Seyedvosoghi
(74) *Attorney, Agent, or Firm* — CHIP LAW GROUP

(57) ABSTRACT

Provided is a communication device which includes a communication section that receives, via a transceiving antenna, a reference signal to be transmitted from a base station, a measurement section that measures a reception-signal level on a basis of the reference signal received by the communication section, and a decision section that decides at least one of a transmission power or a number of times of transmission for starting random access to the base station, on a basis of the reception-signal level measured by the measurement section, and a difference between a gain in a reception frequency band of the transceiving antenna and a gain in a transmission frequency band of the transceiving antenna.

14 Claims, 14 Drawing Sheets

(56) References Cited

U.S. PATENT DOCUMENTS

2018/0376429 A1* 12/2018 Islam ................ H04W 74/008
2019/0313345 A1   10/2019 Jiang et al.

FOREIGN PATENT DOCUMENTS

| WO | 2013/022774 A2 | 2/2013 |
| WO | 2016/144789 A1 | 9/2016 |
| WO | 2019/005614 A1 | 1/2019 |
| WO | 2019/028881 A1 | 2/2019 |

* cited by examiner

[FIG. 1]
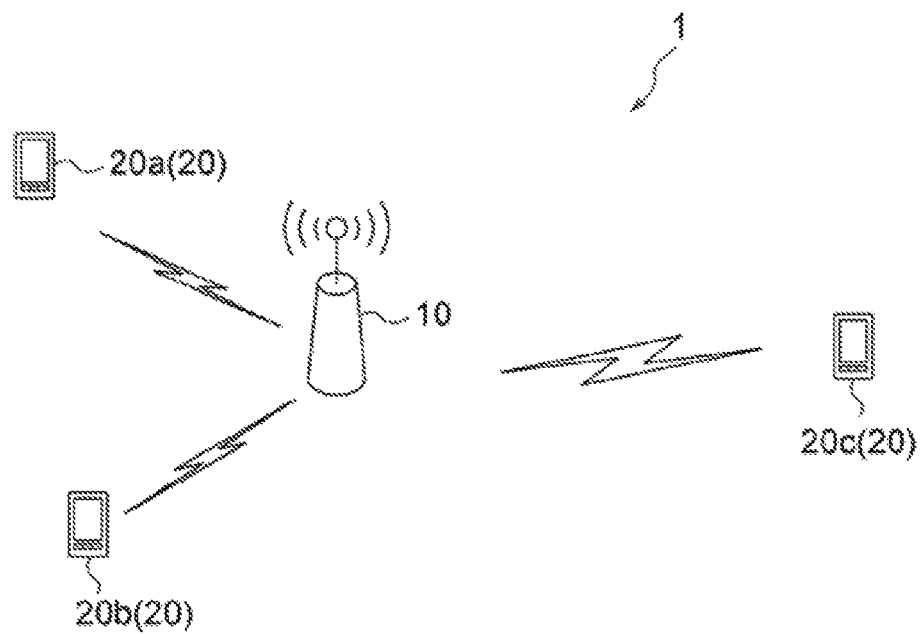

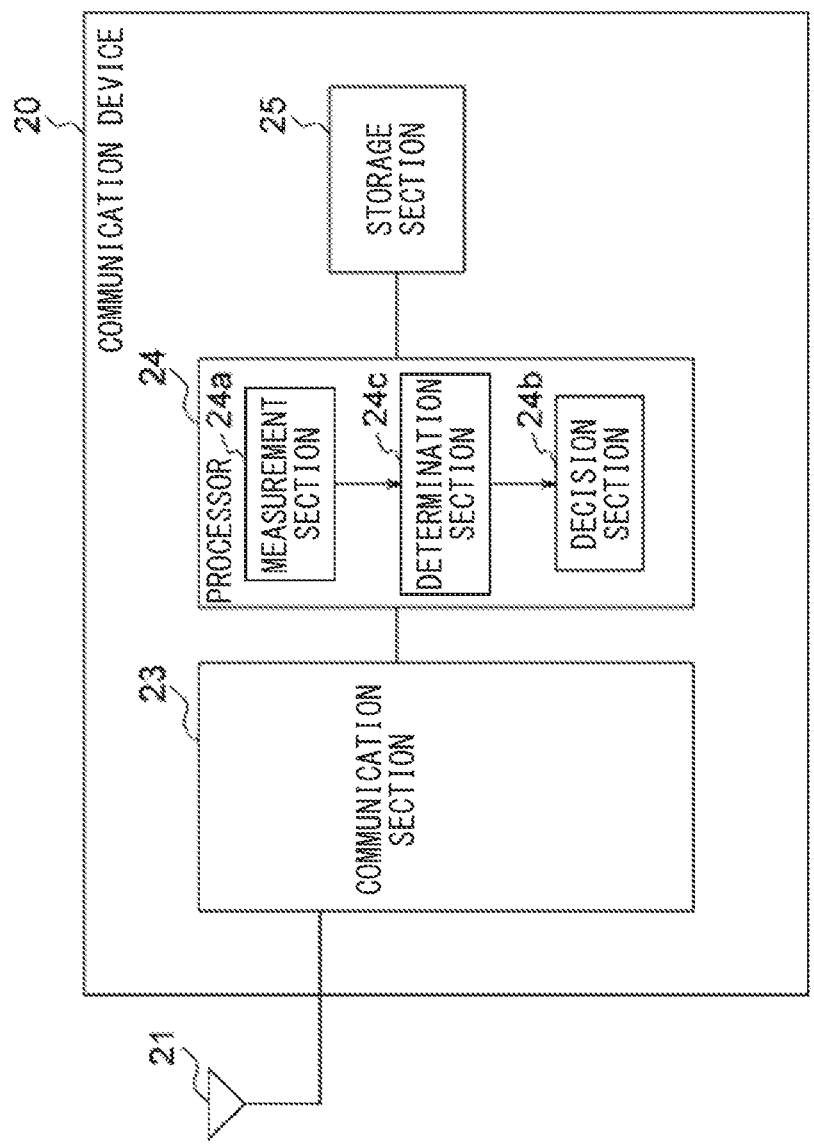
[FIG. 2]

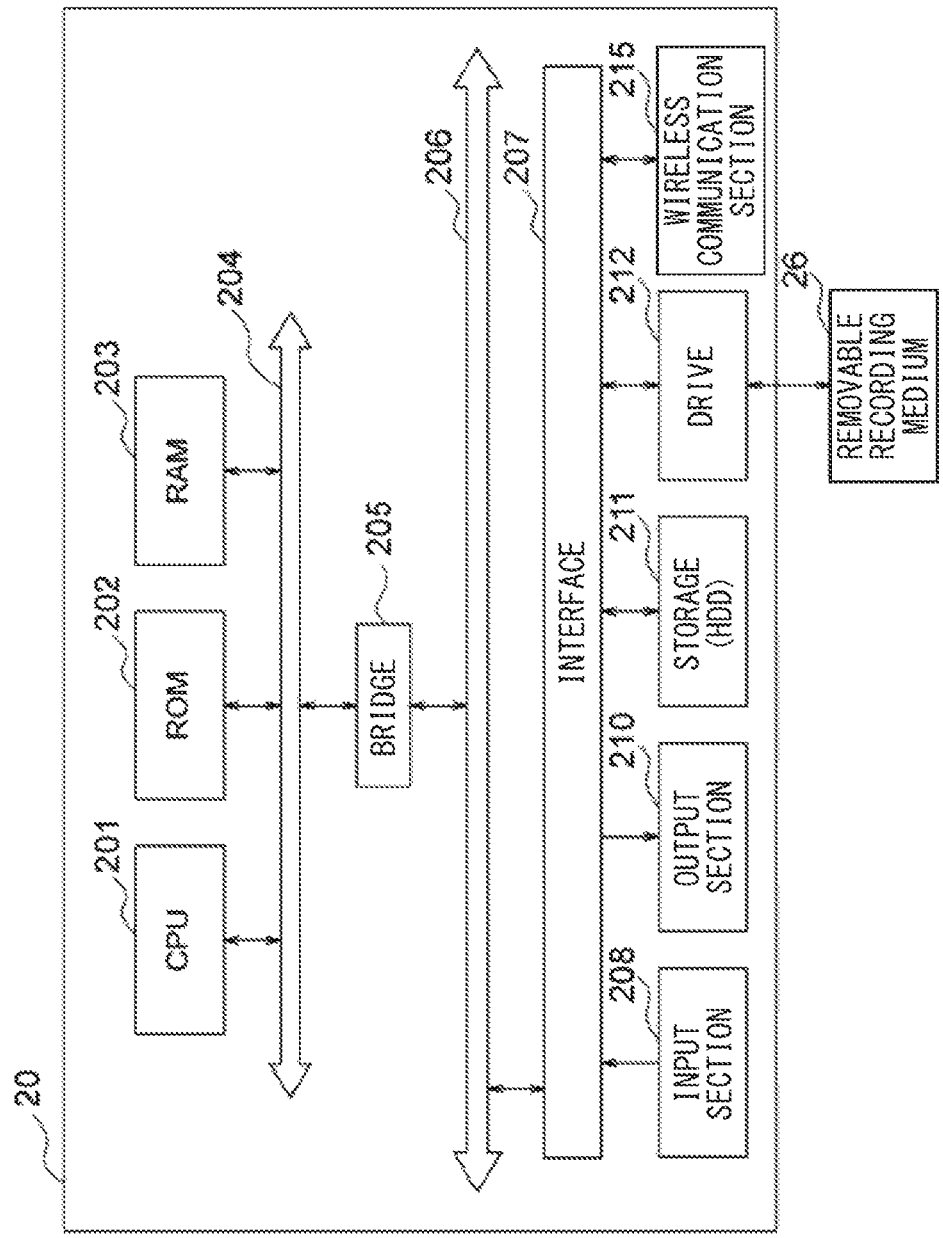
[FIG. 3]

[FIG. 4]
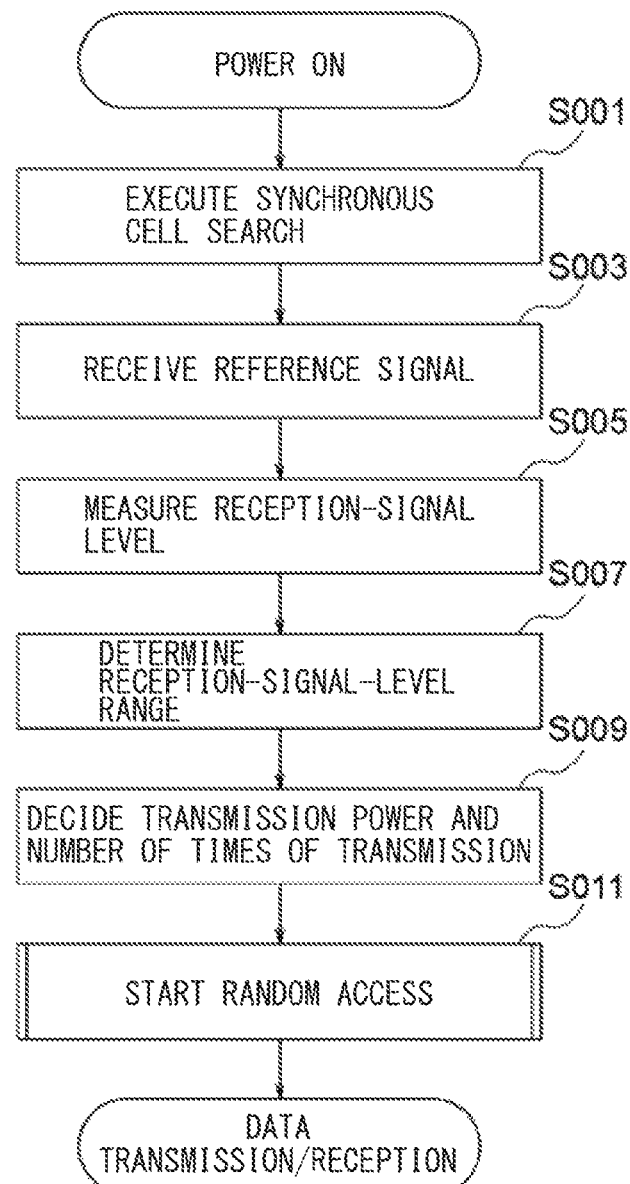

[FIG. 5]

LEVEL RANGE TABLE

|  | RECEPTION-SIGNAL-LEVEL RANGE 1 | RECEPTION-SIGNAL-LEVEL RANGE 2 | RECEPTION-SIGNAL-LEVEL RANGE 3 | RECEPTION-SIGNAL-LEVEL RANGE 4 |
|---|---|---|---|---|
| RSRP (dBm) | GREATER THAN OR EQUAL TO L1 | LESS THAN L1 AND GREATER THAN OR EQUAL TO L2 | LESS THAN L2 AND GREATER THAN OR EQUAL TO L3 | LESS THAN L3 |

[FIG. 6]

NUMBER-OF-TIMES-OF-TRANSMISSION TABLE

|  | NUMBER OF TIMES OF TRANSMISSION |
|---|---|
| RECEPTION-SIGNAL-LEVEL RANGE 1 | 1 |
| RECEPTION-SIGNAL-LEVEL RANGE 2 | N2 |
| RECEPTION-SIGNAL-LEVEL RANGE 3 | N3 |
| RECEPTION-SIGNAL-LEVEL RANGE 4 | N4 |

[FIG. 7]
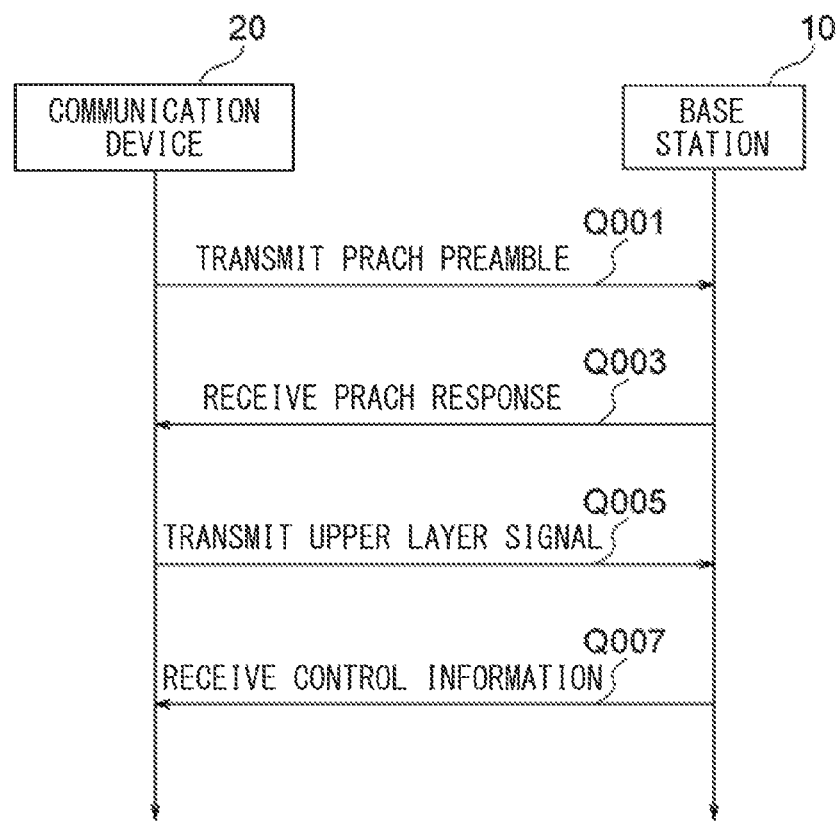

[FIG. 8]
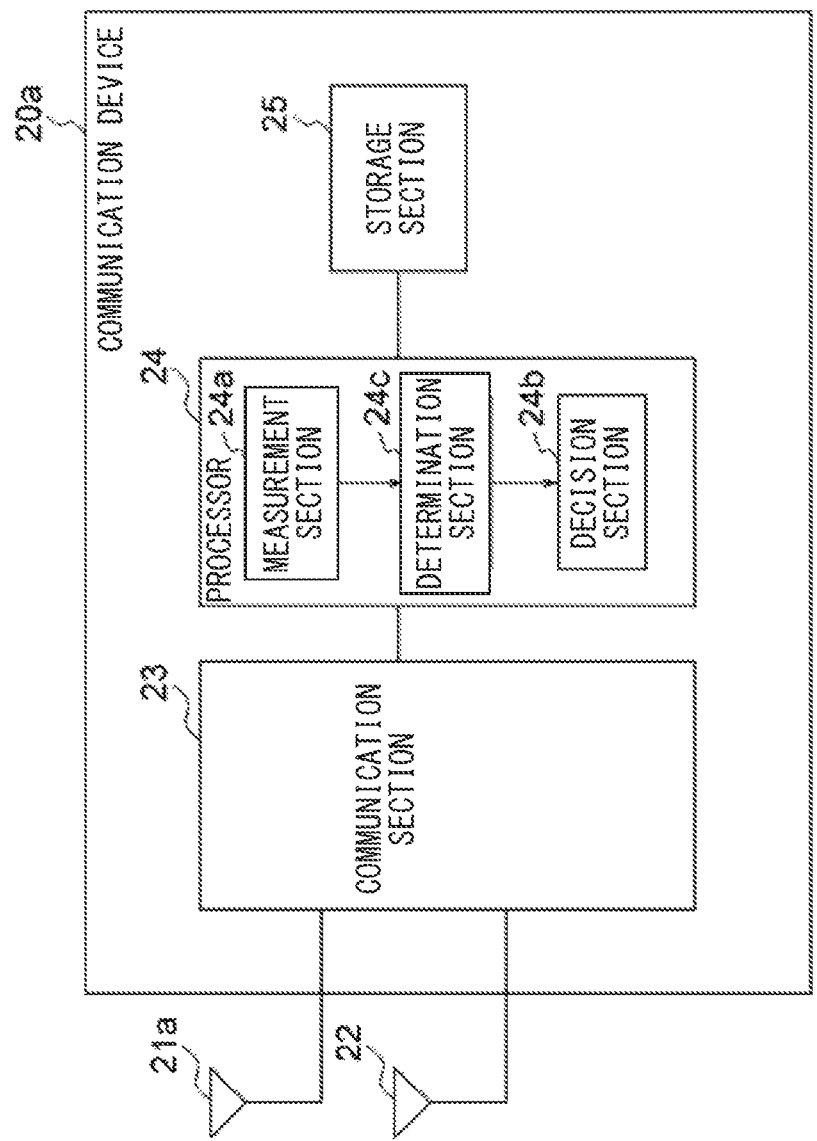

[FIG. 9]
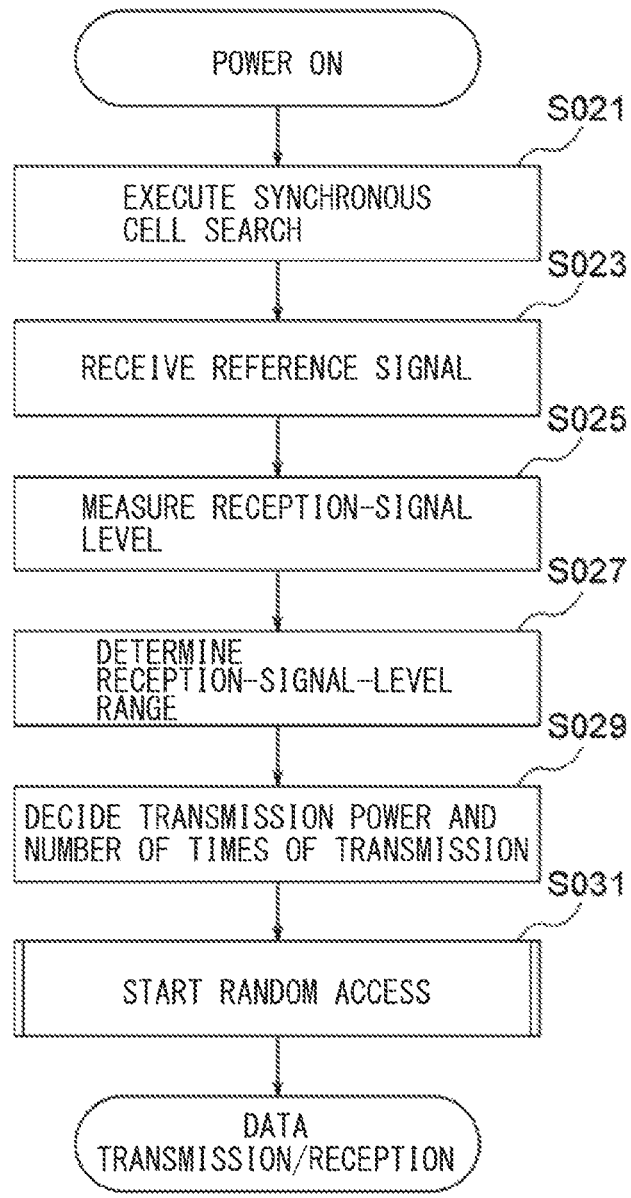

[FIG. 10]

LEVEL RANGE TABLE

|  | RECEPTION-SIGNAL-LEVEL RANGE 1 | RECEPTION-SIGNAL-LEVEL RANGE 2 | RECEPTION-SIGNAL-LEVEL RANGE 3 | RECEPTION-SIGNAL-LEVEL RANGE 4 |
|---|---|---|---|---|
| RSRP (dBm) | GREATER THAN OR EQUAL TO L1 | LESS THAN L1 AND GREATER THAN OR EQUAL TO L2 | LESS THAN L2 AND GREATER THAN OR EQUAL TO L3 | LESS THAN L3 |

[FIG. 11]

NUMBER-OF-TIMES-OF-TRANSMISSION TABLE

|  | NUMBER OF TIMES OF TRANSMISSION |
|---|---|
| RECEPTION-SIGNAL-LEVEL RANGE 1 | 1 |
| RECEPTION-SIGNAL-LEVEL RANGE 2 | N2 |
| RECEPTION-SIGNAL-LEVEL RANGE 3 | N3 |
| RECEPTION-SIGNAL-LEVEL RANGE 4 | N4 |

[FIG. 12]
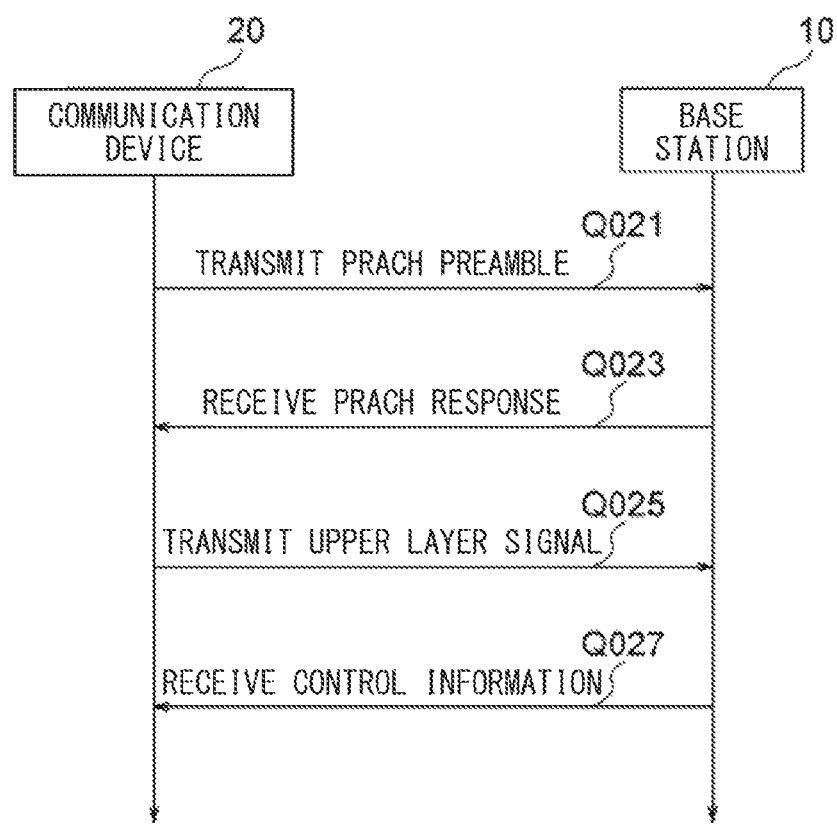

[FIG. 13]
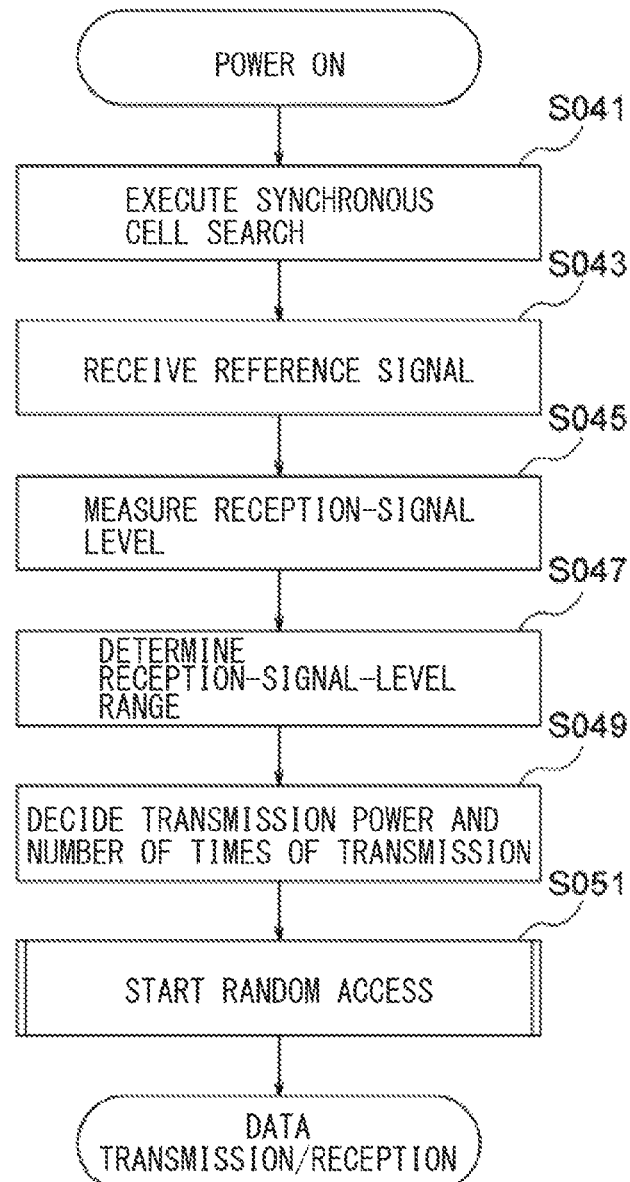

[FIG. 14]

LEVEL RANGE TABLE

| | RECEPTION-SIGNAL-LEVEL RANGE 1 | RECEPTION-SIGNAL-LEVEL RANGE 2 | RECEPTION-SIGNAL-LEVEL RANGE 3 | RECEPTION-SIGNAL-LEVEL RANGE 4 |
|---|---|---|---|---|
| RSRP (dBm) | GREATER THAN OR EQUAL TO L1 | LESS THAN L1 AND GREATER THAN OR EQUAL TO L2 | LESS THAN L2 AND GREATER THAN OR EQUAL TO L3 | LESS THAN L3 |

[FIG. 15]

NUMBER-OF-TIMES-OF-TRANSMISSION TABLE

| | NUMBER OF TIMES OF TRANSMISSION |
|---|---|
| RECEPTION-SIGNAL-LEVEL RANGE 1 | 1 |
| RECEPTION-SIGNAL-LEVEL RANGE 2 | N2 |
| RECEPTION-SIGNAL-LEVEL RANGE 3 | N3 |
| RECEPTION-SIGNAL-LEVEL RANGE 4 | N4 |

[FIG. 16]
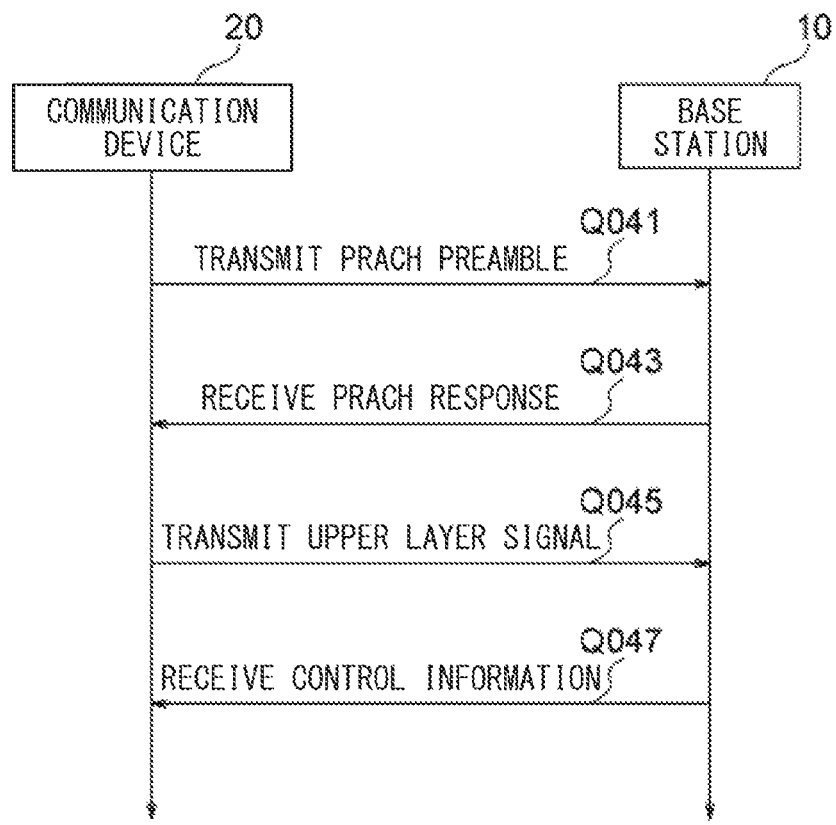

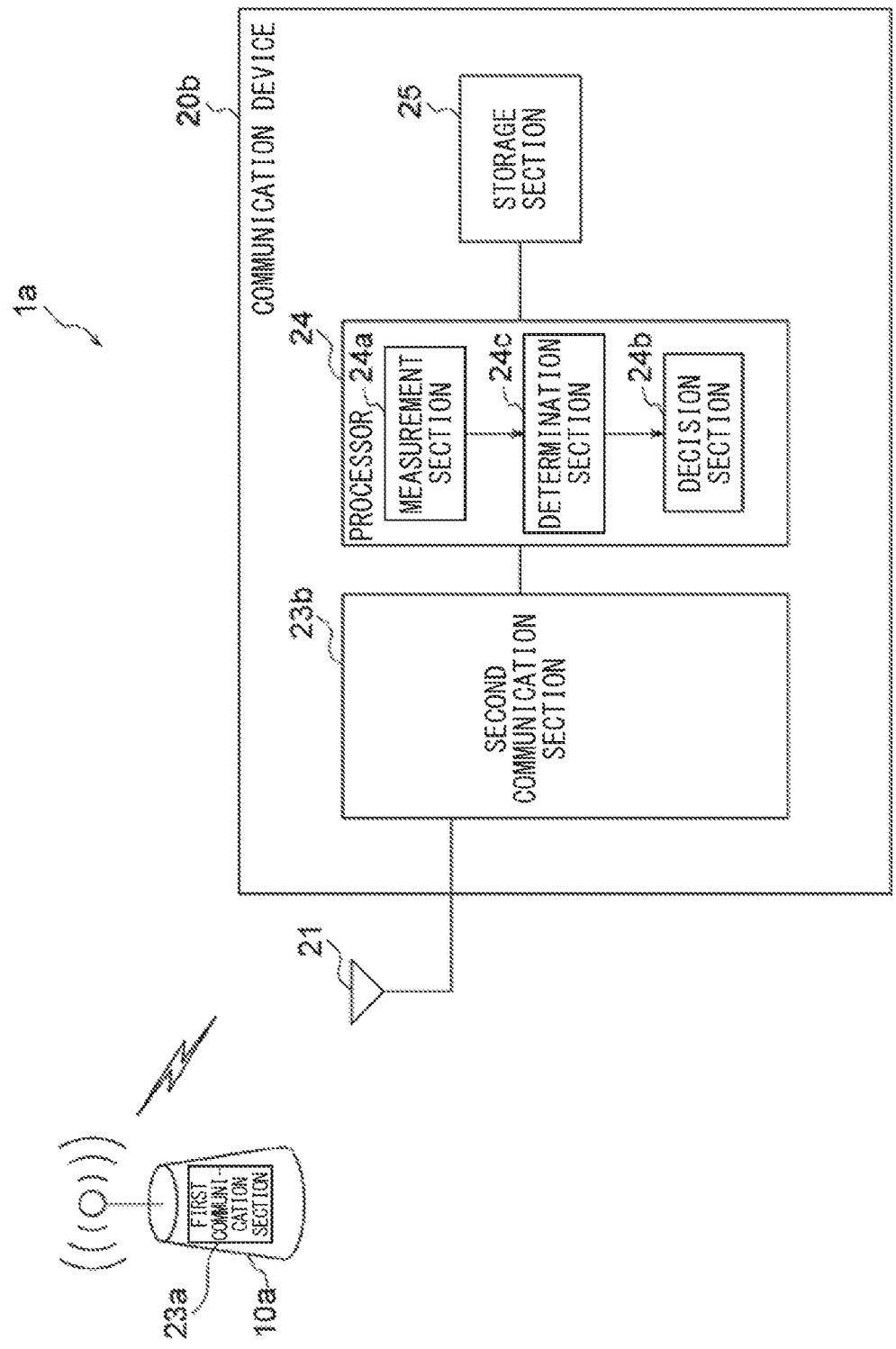

COMMUNICATION DEVICE, COMMUNICATION METHOD, AND COMMUNICATION SYSTEM

CROSS REFERENCE TO RELATED APPLICATIONS

This application is a U.S. National Phase of International Patent Application No. PCT/JP2020/027440 filed on Jul. 15, 2020, which claims priority benefit of Japanese Patent Application No. JP 2019-165936 filed in the Japan Patent Office on Sep. 12, 2019. Each of the above-referenced applications is hereby incorporated herein by reference in its entirety.

TECHNICAL FIELD

The present technology relates to a communication device, a communication method, and a communication system.

BACKGROUND ART

A wireless communication system in which a user apparatus and a base station perform wireless communication with each other has recently been actively developed. In the wireless communication system, communication is performed by radio waves. Here, for example, PTL 1 discloses technology in which, in a case where a user apparatus starts random access to a base station in a wireless communication system, the user apparatus starts the random access several times in accordance with a predetermined random access procedure (see PTL 1).

CITATION LIST

Patent Literature

PTL 1: Japanese Unexamined Patent Application Publication No. 2018-33129

SUMMARY OF THE INVENTION

Problems to be Solved by the Invention

In PTL 1, in order for the user apparatus and the base station to be coupled to each other, the user apparatus first starts random access to the base station in accordance with a random access procedure. In this case, if the user apparatus attempts to establish a connection to the base station using a first beam but fails to establish the connection, the user apparatus attempts to establish the connection to the base station using a second beam whose beam direction differs from a beam direction of the first beam.

In this method, if the user apparatus starts the random access to the base station but fails to establish the connection to the base station, the user apparatus starts the random access again in accordance with the random access procedure. Thus, the user apparatus consumes more power as many times as the connection to base station fails to be established.

The present technology has been made in view of such circumstances, and it is desirable to provide a communication device, a communication method, and a communication system that are able to start random access at an optimal transmission power when starting the random access, thereby reducing the number of times of failing to establish a connection to a base station and reducing power consumption of a user apparatus. Here, optimal transmission power means, for example, a transmission power which is not uselessly large but is a minimum power necessary for random access detection in the base station (the same applies hereinafter).

Means for Solving the Problems

The inventors of the present technology have conducted intensive studies to solve the above-mentioned issues. As a result, the inventors have succeeded in starting the random access at the optimal transmission power when starting the random access, thereby reducing the number of times of failing to establish the connection to the base station and reducing the power consumption of the user apparatus. The present technology has thus been completed.

In other words, the present technology provides a communication device including: a communication section that receives, via a transceiving antenna, a reference signal to be transmitted from a base station; a measurement section that measures a reception-signal level on a basis of the reference signal received by the communication section; and a decision section that decides at least one of a transmission power or a number of times of transmission for starting random access to the base station, on a basis of the reception-signal level measured by the measurement section, and a difference between a gain in a reception frequency band of the transceiving antenna and a gain in a transmission frequency band of the transceiving antenna.

The communication device according to the present technology may further include a determination section. The determination section may determine, among a plurality of reception-signal-level ranges each indicating a predetermined range of the reception-signal level, the reception-signal-level range to which the measured reception-signal level belongs. The decision section may decide at least one of the transmission power or the number of times of transmission for starting the random access to the base station, on a basis of the reception-signal-level range that has been determined, the reception-signal level, and the difference between the gain in the reception frequency band of the transceiving antenna and the gain in the transmission frequency band of the transceiving antenna.

In the communication device according to the present technology, the communication device may operate as a directional antenna in the reception frequency band, and may operate as an omnidirectional antenna in the transmission frequency band.

The communication device according to the present technology may further include a storage section. The storage section may store a number-of-times-of-transmission table. The number-of-times-of-transmission table may have the reception-signal-level range and the number of times of transmission that are associated with each other. The transmission power may be associated, by Equation (1) below, with the difference between the gain in the reception frequency band of the transceiving antenna and the gain in the transmission frequency band of the transceiving antenna, and an attenuation of a transmission power transmitted from the base station. The decision section may decide the number of times of transmission for starting the random access to the base station by referring to the number-of-times-of-transmission table stored in the storage section, and selecting the number of times of transmission corresponding to the reception-signal-level range to which the reception-signal level measured by the measurement section belongs, and may decide the transmission power for starting the random access to the base station by substituting the difference between the gain in the reception frequency band of the transceiving antenna and the gain in the transmission frequency band of the transceiving antenna and the attenuation of the transmission power transmitted from the base station into Equation (1).

[Equation 1]

$$P_{PRACH} = \min\{P_{CMAX}, PRTP + PL + \Delta G_{RX\text{-}TX}\} \quad (1)$$

(In Equation (1), $P_{CMAX}$ represents a maximum power that the communication device is transmittable, PRTP represents a reception target power value at the base station, PL represents the attenuation of the transmission power from the base station to the communication device, and $\Delta G_{RX\text{-}TX}$ represents the difference between the gain in the reception frequency band of the transceiving antenna and the gain in the transmission frequency band of the transceiving antenna.)

In the communication device according to the present technology, the communication section may start the random access to the base station on a basis of the transmission power and the number of times of transmission decided by the decision section.

The communication device according to the present technology may include: a communication section that receives, via a transceiving antenna, a reference signal to be transmitted from a base station; a measurement section that measures a reception-signal level on a basis of the reference signal received by the communication section; and a decision section that decides at least one of a transmission power or a number of times of transmission for starting random access to the base station, on a basis of the reception-signal level measured by the measurement section, and a difference between a gain in a reception frequency band of the transceiving antenna and a gain in a transmission frequency band of the transceiving antenna.

Further, the present technology provides a communication device including: a communication section that receives, via a receiving antenna, a reference signal to be transmitted from a base station; a measurement section that measures a reception-signal level on a basis of the reference signal received by the communication section; and a decision section that decides at least one of a transmission power or a number of times of transmission for starting random access to the base station, on a basis of the reception-signal level measured by the measurement section and a difference between a gain of the receiving antenna and a gain of a transmitting antenna.

The communication device according to the present technology may further include a determination section. The determination section may determine, among a plurality of reception-signal-level ranges each indicating a predetermined range of the reception-signal level, the reception-signal-level range to which the measured reception-signal level belongs. The decision section may decide at least one of the transmission power or the number of times of transmission for starting the random access to the base station, on a basis of the reception-signal-level range that has been determined, the reception-signal level, and the difference between the gain of the receiving antenna and the gain of the transmitting antenna.

In the communication device according to the present technology, the receiving antenna may include a directional antenna, and the transmitting antenna may include an omnidirectional antenna.

The communication device according to the present technology may further include a storage section. The storage section may store a number-of-times-of-transmission table. The number-of-times-of-transmission table may have the reception-signal-level range and the number of times of transmission that are associated with each other. The transmission power may be associated, by Equation (2) below, with the difference between the gain of the receiving antenna and the gain of the transmitting antenna, and an attenuation of a transmission power transmitted from the base station. The decision section may decide the number of times of transmission for starting the random access to the base station by referring to the number-of-times-of-transmission table stored in the storage section, and selecting the number of times of transmission corresponding to the reception-signal-level range to which the reception-signal level measured by the measurement section belongs, and may decide the transmission power for starting the random access to the base station by substituting the difference between the gain of the receiving antenna and the gain of the transmitting antenna and the attenuation of the transmission power transmitted from the base station into Equation (2).

[Equation 2]

$$P_{PRACHA} = \min\{P_{CMAX}, PRTP + PL + \Delta G_{RXA\text{-}TXA}\} \quad (2)$$

(In Equation (2), $P_{CMAX}$ represents a maximum power that the communication device is transmittable, PRTP represents a reception target power value at the base station, PL represents the attenuation of the transmission power from the base station to the communication device, and $\Delta G_{RXA\text{-}TXA}$ represents the difference between the gain of the receiving antenna and the gain of the transmitting antenna.)

In the communication device according to the present technology, the communication section may start the random access to the base station on a basis of the transmission power and the number of times of transmission decided by the decision section.

The present technology provides a communication method including: receiving, via a transceiving antenna, a reference signal to be transmitted from a base station; measuring a reception-signal level on a basis of the reference signal that has been received; and deciding at least one of a transmission power or a number of times of transmission for starting random access to the base station, on a basis of the reception-signal level that has been measured and a difference between a gain in a reception frequency band of the transceiving antenna and a gain in a transmission frequency band of the transceiving antenna.

The present technology provides a communication method including: receiving, via a receiving antenna, a reference signal to be transmitted from a base station; measuring a reception-signal level on a basis of the reference signal that has been received; and deciding at least one of a transmission power or a number of times of transmission for starting random access to the base station, on a basis of the reception-signal level that has been measured and a difference between a gain of the receiving antenna and a gain of a transmitting antenna.

The present technology provides a communication system including: a first communication device; and a second communication device that communicates with the first communication device, in which the first communication device includes a first communication section that transmits a reference signal to the second communication device, and the second communication device includes a transceiving antenna, a second communication section that receives, via the transceiving antenna, the reference signal to be transmitted from the first communication section of the first communication device, a measurement section that measures a reception-signal level on a basis of the reference signal received by the second communication section, and a decision section that decides at least one of a transmission power or a number of times of transmission for starting random access to the first communication device, on a basis of the reception-signal level measured by the measurement section and a difference between a gain in a reception frequency band of the transceiving antenna and a gain in a transmission frequency band of the transceiving antenna.

The present technology provides a communication system including: a first communication device; and a second communication device that communicates with the first communication device, in which the first communication device includes a first communication section that transmits a reference signal to the second communication device, and the second communication device includes a transmitting antenna, a receiving antenna, a second communication section that receives, via the receiving antenna, the reference signal to be transmitted from the first communication section of the first communication device, a measurement section that measures a reception-signal level on a basis of the reference signal received by the second communication section, and a decision section that decides at least one of a transmission power or a number of times of transmission for starting random access to the first communication device, on a basis of the reception-signal level measured by the measurement section and a difference between a gain of the receiving antenna and a gain of the transmitting antenna.

According to the present technology, it is possible to provide the communication device, the communication method, and the communication system that are able to start the random access at an optimal transmission power when starting the random access, to reduce the number of times of failing to establish a connection to the base station, and to reduce power consumption of a user apparatus. It is to be noted that effects described here are not necessarily limited and any of effects described in the present disclosure may be included.

BRIEF DESCRIPTION OF DRAWINGS

FIG. 1 is an explanatory diagram illustrating an overall configuration of a communication system using a communication device (wireless terminal) according to a first embodiment of the present technology.

FIG. 2 is an explanatory diagram illustrating a functional block diagram of the communication device (mobile terminal) according to the first embodiment of the present technology.

FIG. 3 is a block diagram illustrating a hardware configuration of the communication device (mobile terminal) according to the first embodiment of the present technology.

FIG. 4 is a flowchart illustrating an operation of the communication device (mobile terminal) according to the first embodiment of the present technology.

FIG. 5 is a level range table stored in a storage section.

FIG. 6 is a number-of-times-of-transmission table stored in the storage section.

FIG. 7 is a sequence diagram illustrating an operation of random access of the communication device (mobile terminal) according to the first embodiment of the present technology.

FIG. 8 is an explanatory diagram illustrating a functional block diagram of a communication device (mobile terminal) according to a second embodiment of the present technology.

FIG. 9 is a flowchart illustrating an operation of the communication device (mobile terminal) according to the second embodiment of the present technology.

FIG. 10 is a level range table stored in the storage section.

FIG. 11 is a number-of-times-of-transmission table stored in the storage section.

FIG. 12 is a sequence diagram illustrating an operation of random access of the communication device (mobile terminal) according to the second embodiment of the present technology.

FIG. 13 is a flowchart illustrating a communication method of a communication device (mobile terminal) according to a third embodiment of the present technology.

FIG. 14 is a level range table stored in the storage section.

FIG. 15 is a number-of-times-of-transmission table stored in the storage section.

FIG. 16 is a sequence diagram illustrating an operation of random access of the communication device (mobile terminal) according to the third embodiment of the present technology.

FIG. 17 is an explanatory diagram illustrating a configuration of a communication system according to a fourth embodiment of the present technology.

MODES FOR CARRYING OUT THE INVENTION

In the following, some embodiments of the present disclosure are described in detail with reference to the drawings. It is to be noted that the following embodiments to be described below are specific examples of the present technology, and the scope of the present technology is not to be narrowly construed by the embodiments.

It is to be noted that description is given in the following order.
1. First Embodiment (Example 1 of Communication Device)
2. Second Embodiment (Example 2 of Communication Device)
3. Third Embodiment (Example of Communication Method)
4. Fourth Embodiment (Example of Communication System)

1. First Embodiment (Example 1 of Communication Device)

In order to describe a communication device (wireless terminal) according to a first embodiment the present technology, a communication system using the communication device (wireless terminal) according to the first embodiment will be described first, following which the communication device (wireless terminal) will be described. For this reason, first, an overall configuration of the communication system will be described. Further, the communication system described in the first embodiment corresponds to a communication system according to a fourth embodiment to be described later.

[Overall Configuration of Communication System]

FIG. 1 illustrates an overall configuration of a communication system 1 using a communication device (wireless terminal) 20 according to the first embodiment of the present technology. As illustrated in FIG. 1, the communication system 1 includes a base station 10, a communication device (mobile terminal) 20a, a communication device (mobile terminal) 20b, and a communication device (mobile terminal) 20c. It is to be noted that the number of communication devices, i.e., the communication device (wireless terminal) 20a, the communication device (wireless terminal) 20b, and the communication device (wireless terminal) 20c, is not limited to three, and if at least one of the communication devices (wireless terminals) 20 is coupled to the base station 10, it is possible to configure the communication system 1. Also, in a case where it is not necessary to define one communication device (wireless terminal) among the three communication devices (wireless terminals), i.e., the communication device (wireless terminal) 20a, the communication device (wireless terminal) 20b, and the communication device (wireless terminal) 20c, it is simply described as communication device (wireless terminal) 20.

The base station 10 provides, for example, wireless communication services (e.g., LTE, WiMAX, 5G, etc.) to the communication device (wireless terminal) 20. The base station 10 communicates with the communication device (mobile terminal) 20 using radio multiplex access such as orthogonal frequency-division multiple access (OFDMA), time-division multiple access (TDMA), or code-division multiple access (CDMA).

[Configuration of Functional Blocks of Communication Device (Mobile Terminal)]

FIG. 2 illustrates a functional block diagram of the communication device (mobile terminal) 20 according to the first embodiment of the present technology. As illustrated in FIG. 2, the communication device (mobile terminal) 20 according to the first embodiment includes a transceiving antenna 21, a communication section 23, a processor 24, and a storage section 25.

The transceiving antenna 21 has a function as a transmitting antenna and a function as a receiving antenna. The transceiving antenna 21 has a gain as the receiving antenna decided by a gain in a reception frequency band, and has a gain as the transmitting antenna decided by a gain in a transmission frequency band. It is to be noted that the transceiving antenna 21 may operate as a directional antenna in the reception frequency band, and may operate as an omnidirectional antenna in the transmission frequency band.

The communication section 23 is coupled to the base station 10 by a wireless communication section 215 to be described later. The communication section 23 receives, via the transceiving antenna 21, a reference signal to be transmitted from the base station 10. The communication section 23 also transmits the radio signal via the transceiving antenna 21. In this case, the communication section 23 starts random access to the base station 10 on the basis of a transmission power and the number of times of transmission which are decided by a decision section 24b.

The processor 24 includes a measurement section 24a and the decision section 24b. The measurement section 24a measures a reception-signal level on the basis of the reference signal received by the communication section 23. The decision section 24b decides at least one of the transmission power or the number of times of transmission for starting the random access to the base station 10, on the basis of: the reception-signal level measured by the measurement section 24a; and a difference between a gain in the reception frequency band of the transceiving antenna 21 and a gain in the transmission frequency band of the transceiving antenna 21.

Further, the processor 24 may further include a determination section 24c. The determination section 24c determines, among a plurality of reception-signal-level ranges each indicating a predetermined range of the reception-signal level, the reception-signal-level range to which the measured reception-signal level belongs. In this case, the decision section 24b decides at least one of the transmission power or the number of times of transmission for starting the random access to the base station 10, on the basis of: the reception-signal-level range determined by the determination section 24c; the reception-signal level; and the difference between the gain in the reception frequency band of the transceiving antenna 21 and the gain in the transmission frequency band of the transceiving antenna 21.

Here, a transmission power $P_{PRACH}$ decided by the decision section 24b is determined by the following Equation (1). Further, as indicated in Equation (1) below, the transmission power $P_{PRACH}$ is associated with: the difference between the gain in the reception frequency band of the transceiving antenna 21 and the gain in the transmission frequency band of the transceiving antenna 21; and an attenuation of a transmission power transmitted from the base station 10.

[Equation 3]

$$P_{PRACH} = \min\{P_{CMAX}, PRTP + PL + \Delta G_{RX-TX}\} \quad (1)$$

(In Equation (1), $P_{CMAX}$ represents a maximum transmission power that the communication device (mobile terminal) 20 is transmittable, PRTP represents a reception target power value at the base station 10, PL represents the attenuation of the transmission power from the base station 10 to the communication device (mobile terminal) 20, and $\Delta G_{RX-TRX}$ represents the difference between the gain in the reception frequency band of the transceiving antenna 21 and the gain in the transmission frequency band of the transceiving antenna 21. It is to be noted that $P_{CMAX}$ is, for example, 23 [dBm].)

In Equation (1), first, a sum of the following is calculated: the difference $\Delta G_{RX-TX}$ between the gain in the reception frequency band of the transceiving antenna 21 and the gain in the transmission frequency band of the transceiving antenna 21; the attenuation PL of the transmission power from the base station 10 to the communication device (mobile terminal) 20; and the reception target power value PRTP at the base station 10. Thereafter, the transmission power $P_{PRACH}$ is determined by comparing the sum with the maximum transmission power (e.g., 23 [dBm]) that the communication device (mobile terminal) 20 is transmittable, and selecting the smaller value as the transmission power.

As a result, the communication device (wireless terminal) 20 according to the first embodiment is able to calculate the transmission power $P_{PRACH}$ by using the gain in the reception frequency band of the transceiving antenna 21 and the gain in the transmission frequency band of the transceiving antenna 21, thereby avoiding failing to establish a connection to the base station 10.

The storage section 25 stores a level range table and a number-of-times-of-transmission table. In the level range table, the reception-signal level and the reception-signal-level range are associated with each other. In the number-of-times-of-transmission table, the reception-signal-level range and the number of times of transmission are associated with each other. It is to be noted that the level range table and the number-of-times-of-transmission table will be described in detail using a flowchart to be described later.

[Hardware Configuration of Communication Device (Mobile Terminal)]

FIG. 3 illustrates a hardware configuration of the communication device (wireless terminal) 20 according to the embodiment of the present technology. As illustrated in FIG. 3, the communication device (mobile terminal) 20 according to the embodiment of the present technology includes a CPU (Central Processing Unit) 201, a ROM (Read Only Memory) 202, a RAM (Random Access Memory) 203, and a host bus 204. The communication device (mobile terminal) 20 further includes a bridge 205, an external bus 206, an interface 207, an input section 208, an output section 210, a storage (HDD) 211, a drive 212, and the wireless communication section 215.

The CPU 201 functions as an arithmetic processing unit and a control unit and controls an overall operation in the communication device (mobile terminal) 20 in accordance with various programs. The CPU 201 includes, for example, a microprocessor. The ROM 202 stores a program, an operation parameter, and the like to be used by the CPU 201. The RAM 203 temporarily stores a programs to be used in execution of the CPU 201, a parameter to be appropriately changed in the execution, and the like.

The CPU 201 executes the program stored in the ROM 202, thereby being able to configure the processor 24 illustrated in FIG. 2 and causing functions of the measurement section 24a, the decision section 24b, and the determination section 24c to be executed.

Further, the CPU 201 is coupled to the ROM 202 via the host bus 204. Still further, the CPU 201 is coupled to the RAM 203 via the host bus 204. The ROM 202 is coupled to RAM 203 via the host bus 204.

The host bus 204 is coupled to the external bus 206 such as a PCI (Peripheral Component Interconnect/Inter face) bus via the bridge 205. It is to be noted that the host bus 204, the bridge 205, and the external bus 206 do not necessarily have to be configured separately as illustrated in FIG. 3, and may be implemented in one bus.

The input section 208 includes, for example: an input device such as a mouse, a keyboard, a touch panel, a button, a microphone, a switch, a lever, or the like, for a user to input information; and an input control circuit that generates an input signal on the basis of input by the user and inputs the input signal to the CPU 201. The user who possesses the communication (mobile terminal) 20 is able to input various types of data to the communication device (mobile terminal) 20 or issue an instruction of a process or an operation by operating the input section 208.

The output section 210 may be coupled to, for example, a display device such as a liquid crystal display (LCD) device, an OLED (Organic Light Emitting Diode) device, or a lamp. Further, the output section 210 includes an audio output device such as a speaker or headphones. The output section 210 outputs reproduced content, for example. Specifically, the display device displays various types of information such as reproduced video data in text or images. In contrast, the audio output device converts the reproduced audio data or the like into audio and outputs the audio.

The storage 211 is a device that stores data configured as an example of a storage section of the communication device (mobile terminal) 20. The storage 211 may include a storage medium, a recording device that records data on the storage medium, a reading device that reads data from the storage medium, and a deleting device that deletes data recorded on the storage medium. The storage 211 includes, for example, an HDD (Hard Disk Drive). This storage 211 drives a hard disk and stores a program and various types of data to be executed by the CPU 201. The storage 211 includes the storage section 25.

The drive 212 is a reader/writer for a storage medium, and is built in or externally attached to the communication device (mobile terminal) 20. The drive 212 reads information recorded on a removable recording medium 26 such as a magnetic disk, an optical disc, a magneto-optical disk, or a semiconductor memory, and outputs the read information to the RAM 203.

The wireless communication section 215 is an interface for communicating with the base station 10. The wireless communication section 215 has a communication function to transmit and receive a radio signal to and from the base station 10.

[Operation of Communication Device (Wireless Terminal)]

FIG. 4 is a flowchart illustrating an operation of the communication device (wireless terminal) 20 according to the first embodiment of the present technology. The following describes an operation from when the communication device (wireless terminal) 20 is powered on until when the communication device (wireless terminal) 20 starts transmitting and receiving data to and from the base station 10.

When the communication device (wireless terminal) 20 according to the first embodiment of the present technology is powered on, the communication device (wireless terminal) 20 executes synchronous cell search (step S001), and executes a cell selection procedure. In the synchronous cell search, the communication device (wireless terminal) 20 detects a synchronization signal and executes decoding of a PBCH (Physical Broadcast Channel). In this case, the communication device (wireless terminal) 20 performs, on the basis of the detection of the synchronization signal, downlink synchronization with the base station 10 in the cell. After the downstream link synchronization is established, the communication device (wireless terminal) 20 executes decoding of broadcast information. The broadcast information includes an MIB (Master Information Block) and an SIB (System Information Block).

Here, a process of transition from a state in which the communication device (wireless terminal) 20 is not coupled to any cell (idle state) to a state in which a connection is established to any cell (coupled state) is referred to as initial connection. It is to be noted that it is also regarded as the initial connection that a process of transition from a state which is not active (inactive state) although the connection to the cell is established and RRC (Radio Resource Control) has been completed, to the coupled state.

The communication device (wireless terminal) 20 receives, by the communication section 23, via the transceiving antenna 21, a reference signal (CRS: Cell-specific Reference Signal) to be transmitted from the base station 10 (step S003). The communication device (wireless terminal) 20 measures, by the processor 24, the reception-signal level on the basis of the reference signal CRS received by the communication section 23 (step S005). It is to be noted that the measurement is performed by the measurement section 24a and is measurement of a quality of a propagation path between the base station 10 and the communication device (wireless terminal 20.)

The measurement section 24a of the communication device (wireless terminal) 20 measures a reference signal received power (RSRP) with respect to the reference signal CRS.

The reference signal received power RSRP is a reference signal CRS received power per single resource element. That is, the reference signal received power RSRP is an average value of the reference signal CRS received power.

The reference signal CRS received power is obtained by correlation detection between a reception signal in the resource element of the reference signal CRS and the reference signal CRS which is a known signal. It is to be noted that the reference signal received power RSRP corresponds to a desired signal "S (Signal)".

Thus, the measurement section 24a of the communication device (wireless terminal) 20 is able to measure the reference received signal power RSRP as the reception-signal level with respect to the reference signal CRS.

The communication device (wireless terminal) 20 determines, by the determination section 24c, among the plurality of reception-signal-level ranges each indicating the predetermined range of the reception-signal level, the reception-signal-level range to which the measured reception-signal level belongs (step S007).

The determination section 24c of the communication device (wireless terminal) 20 refers to the level range table illustrated in FIG. 5 to determine the reception-signal-level range to which the measured reception-signal level (reference received signal power RSRP) belongs.

FIG. 5 illustrates the level range table indicating the ranges of the reception-signal level (reference received signal power RSRP). FIG. 5 indicates an extent to which the determination section 24c determines the reception-signal-level range in accordance with a value of the measured reception-signal level (reference received signal power RSRP).

The determination section 24c of the communication device (wireless terminal) 20 determines that: if the measured reception-signal level (reference received signal power RSRP) is greater than or equal to L1, the reception-signal level (reference received signal power RSRP) belongs to a reception-signal-level range 1; if the measured reception-signal level (reference received signal power RSRP) is greater than or equal to L2 and less than L1, the reception-signal level (reference received signal power RSRP) belongs to a reception-signal-level range 2; if the measured reception-signal level (reference received signal power RSRP) is greater than or equal to L3 and less than L2, the reception-signal level (reference received signal power RSRP) belongs to a reception-signal-level range 3; and if the measured reception-signal level (reference received signal power RSRP) is less than L3, the reception-signal level (reference received signal power RSRP) belongs to a reception-signal-level range 4. It is to be noted that the reception-signal levels L1 to L3 are each not limited to a constant, and may each be a variable.

The communication device (wireless terminal) 20 decides, by the decision section 24b, at least one of the transmission power or the number of times of transmission for starting the random access to the base station 10, on the basis of: the reception-signal level measured by the measurement section 24a; and the difference $\Delta G_{RX\text{-}TX}$ between the gain in the reception frequency band of the transceiving antenna 21 and the gain in the transmission frequency band of the transceiving antenna 21 (step S009).

In this case, the decision section 24b of the communication device (wireless terminal) 20 may decide at least one of the transmission power or the number of times of transmission for starting the random access to the base station 10, on the basis of: the reception-signal-level range determined by the determination section 24c; the reception-signal level; and the difference $\Delta G_{RX\text{-}TX}$ between the gain in the reception frequency band of the transceiving antenna 21 and the gain in the transmission frequency band of the transceiving antenna 21 (step S009).

The decision section 24b of the communication device (wireless terminal) 20 refers to the number-of-times-of-transmission table stored in the storage section 25, and selects the number of times of transmission corresponding to the reception-signal-level range to which the reception-signal level measured by the measurement section 24a belongs, to thereby decide the number of times of transmission for starting the random access to the base station 10 (step S009).

FIG. 6 illustrates the number-of-times-of-transmission table stored in the storage section 25. As indicated in FIG. 6, the number of times of transmission corresponding to the reception-signal-level range is set in the number-of-times-of-transmission table.

For example, if the measured reception-signal level belongs to the reception-signal-level range 1, the decision section 24b decides that the number of times of transmission is "1". Further, if the measured reception-signal level belongs to the reception-signal-level range 2, the decision section 24b decides that the number of times of transmission is "N2". Further, if the measured reception-signal level belongs to the reception-signal-level range 3, the decision section 24b decides that the number of times of transmission is "N3". Further, if the measured reception-signal level belongs to the reception-signal-level range 4, the decision section 24b decides that the number of times of transmission is "N4". It is to be noted that the number of times of transmission values N2 to N4 are each not limited to a constant, and may each be a variable.

Further, the decision section 24b of the communication device (wireless terminal) 20 substitutes the difference $\Delta G_{RX\text{-}TX}$ between the gain in the reception frequency band of the transceiving antenna 21 and the gain in the transmission frequency band of the transceiving antenna 21, and the attenuation PL of the transmission power transmitted from the base station 10 into Equation (1), to thereby decide the transmission power $P_{PRACH}$.

[Equation 4]

$$P_{PRACH} = \min\{P_{CMAX}, PRTP + PL + \Delta G_{RX\text{-}TX}\} \quad (1)$$

In the first embodiment, upon calculating the transmission power $P_{PRACH}$, not only the reception target power value PRTP at the base station 10 and the attenuation PL of the transmission power from the base station 10 to the communication device (mobile terminal) 20 are added up, but also the difference $\Delta G_{RX\text{-}TX}$ between the gain in the reception frequency band of the transceiving antenna 21 and the gain in the transmission frequency band of the transceiving antenna 21 is added thereto. It is thus possible to calculate the transmission power $P_{PRACH}$ using the gain in the reception frequency band of the transceiving antenna 21 and the gain in the transmission frequency band of the transceiving antenna 21.

In the first embodiment, the sum of the reception target power value PRTP at the base station 10, the attenuation PL of the transmission power from the base station 10 to the communication device (mobile terminal) 20, and the difference $\Delta G_{RX\text{-}TX}$ between the gain in the reception frequency band of the transceiving antenna 21 and the gain in the transmission frequency band of the transceiving antenna 21 is calculated; the sum is compared with the maximum transmission power of the communication device (wireless terminal) 20; and the smaller value thereof is determined to be the transmission power $P_{PRACH}$.

The communication device (wireless terminal) 20 of the first embodiment is thus able to calculate the transmission power $P_{PRACH}$ using the gain in the reception frequency band of the transceiving antenna 21 and the gain in the transmission frequency band of the transceiving antenna 21, which makes it possible to avoid failing to establish a connection to the base station 10.

In this way, the decision section 24b of the communication device (wireless terminal) 20 is able to decide the transmission power and the number of times of transmission for starting the random access to the base station 10 (step S009).

Thereafter, the communication device (wireless terminal) 20 according to the first embodiment starts the random access by the random access procedure (step S011).

FIG. 7 illustrates a sequence diagram from when the communication device (wireless terminal) 20 starts the random access in accordance with the random access procedure until when the communication device (wireless terminal) 20 transmits and receives data. As described in FIG. 7, the communication device (wireless terminal) 20 starts the random access procedure on the basis of the transmission power and the number of times of transmission decided by the decision section 24b of the processor 24.

First, the communication device (wireless terminal) 20 selects a predetermined PRACH preamble, and transmits the selected PRACH preamble to the base station 10 as a message 1 (sequence Q001). Thereafter, the communication device (wireless terminal) 20 receives a RRACH response including a random access response corresponding to the PRACH preamble from the base station 10 as a message 2 (sequence Q003).

Thereafter, the communication device (wireless terminal) 20 transmits a signal including an upper layer to the base station 10 as a message 3 using a resource scheduled by a random access response grant included in the random access response (sequence 005). It is to be noted that the message 3 includes an RRC message of an RRC connection request. Thereafter, the communication device (wireless terminal) 20 receives control information for RRC connection including conflict resolution from the base station 10 as a message 4 (sequence 007). In this case, the message 4 includes an RRC message for setting up the RRC connection.

In a case where the communication device (wireless terminal) 20 receives the RRC message for setting up the RRC connection, the communication device (wireless terminal) 20 performs an RRC connection operation and transitions from an RRC idle state to an RRC coupled state. After entering the RRC coupled state, the communication device (wireless terminal) 20 transmits an RRC message of RRC connection setup completion to the base station 10. The series of operations allows the communication device (wireless terminal) 20 to be coupled to the base station 10. It is to be noted that the RRC message of RRC connection setup completion may be referred to as message 5.

After the process of the random access procedure is completed, the communication device (wireless terminal) 20 transitions to the state of being coupled to the cell (coupled state), and data transmission and reception are performed.

As described above, when transmitting the predetermined PRACH preamble to the base station 10 (sequence Q001) as the message 1, the communication device (wireless terminal) 20 according to the first embodiment of the present technology is able to start the random access to the base station 10 at the transmission power $P_{PRACH}$ obtained by using the difference $\Delta G_{RX-TX}$ between the gain in the reception frequency band of the transceiving antenna 21 and the gain in the transmission frequency band of the transceiving antenna 21.

As a result, the communication device (wireless terminal) 20 according to the first embodiment of the present technology is able to start the random access at the optimal transmission power when starting the random access, thereby reducing the number of times of failing to establish the connection to the base station 10 and reducing the power consumption of the user apparatus. In other words, the communication device (wireless terminal) 20 according to the first embodiment of the present technology is able to reduce a possibility of failing to perform the random access, which makes it possible to reduce the power consumed by the communication device (wireless terminal) 20.

It is to be noted that the random access procedure is not limited to the initial connection, and is also applicable to cases of handover, uplink synchronization, uplink resource request, recovery from wireless link failure, recovery from beam link failure, and the like.

2. Second Embodiment (Example 2 of Communication Device)

FIG. 8 illustrates a functional block diagram of a communication device (mobile terminal) 20a according to a second embodiment of the present technology. As illustrated in FIG. 8, the communication device (mobile terminal) 20a according to the second embodiment includes a transmitting antenna 21a, a receiving antenna 22, a communication section 23, a processor 24, and a storage section 25. It is to be noted that the communication device (mobile terminal) 20a is an example of the communication device (mobile terminal) 20a illustrated in FIG. 1.

The communication device (mobile terminal) 20a according to the second embodiment of the present technology differs from the communication device (wireless terminal) 20 according to the first embodiment of the present technology in that the communication device (mobile terminal) 20a includes the transmitting antenna 21a and the receiving antenna 22 in place of the transceiving antenna 21. The communication section 23, the processor 24, and the storage section 25 have the same configurations as those included in the communication device (wireless terminal) 20 according to the first embodiment. Accordingly, the same components as those included in the communication device (wireless terminal) 20 according to the first embodiment are denoted by the same reference numerals, and description thereof will be omitted as appropriate.

The communication device (wireless terminal) 20a according to the second embodiment of the present technology is applicable to the communication system 1 described in the first embodiment.

The communication section 23 of the communication device (wireless terminal) 20a according to the second embodiment receives, via the receiving antenna 22, a reference signal to be transmitted from the base station 10. The communication section 23 also transmits a radio signal via the transmitting antenna 21a. In this case, the communication section 23 of the communication device (wireless terminal) 20a according to the second embodiment starts the random access to the base station 10 on the basis of the transmission power and the number of times of transmission which are decided by the decision section 24b.

The measurement section 24a of the communication device (wireless terminal) 20a according to the second embodiment measures a reception-signal level on the basis of the reference signal received by the communication section 23. The decision section 24b decides at least one of the transmission power or the number of times of transmission for starting the random access to the base station 10 on the basis of: the reception-signal level measured by the measurement section 24a: and a difference between a gain of the receiving antenna 22 and a gain of the transmitting antenna 21a.

A transmission power $P_{PRACHA}$ decided by the decision section 24b is determined by the following Equation (2). Further, as indicated in Equation (2) below, the transmission power $P_{PRACHA}$ is associated with: the difference between the gain of the receiving antenna 22 and the gain of the transmitting antenna 21a; and an attenuation of a transmission power transmitted from the base station 10.

[Equation 5]

$$P_{PRACHA} = \min\{P_{CMAX}, PRTP + PL + \Delta G_{RXA\text{-}TXA}\} \quad (2)$$

(In Equation (2), $P_{CMAX}$ represents a maximum transmission power that the communication device (mobile terminal) 20 is transmittable, PRTP represents a reception target power value at the base station 10, PL represents the attenuation of the transmission power from the base station 10 to the communication device (mobile terminal) 20, and $\Delta G_{RXA\text{-}TXA}$ represents the difference between the gain of the receiving antenna 22 and the gain of the transmitting antenna 21a. The maximum transmission power $P_{CMAX}$ is, for example, 23 [dBm].)

In Equation (2), first, a sum of the following is calculated: the difference $\Delta G_{RXA\text{-}TXA}$ between the gain of the receiving antenna 22 and the gain of the transmitting antenna 21a; the attenuation PL of the transmission power from the base station 10 to the communication device (mobile terminal) 20; and the reception target power value PRTP at the base station 10. Thereafter, the transmission power $P_{PRACHA}$ is determined by comparing the sum with the maximum transmission power (e.g., 23 [dBm]) that the communication device (mobile terminal) 20 is transmittable, and selecting the smaller value as the transmission power.

As a result, the communication device (wireless terminal) 20a according to the second embodiment is able to calculate the transmission power $P_{PRACHA}$ by using the gain of the receiving antenna 22 and the gain of the transmitting antenna 21a, thereby avoiding failing to establish a connection to the base station 10. Incidentally, the receiving antenna 22 may include a directional antenna, and the transmitting antenna 21a may include an omnidirectional antenna.

The storage section 25 stores a level range table and a number-of-times-of-transmission table. In the level range table, the reception-signal level and the reception-signal-level range are associated with each other. In the number-of-times-of-transmission table, the reception-signal-level range and the number of times of transmission are associated with each other. It is to be noted that the level range table and the number-of-times-of-transmission table will be described in detail using a flowchart to be described later.

[Operation of Communication Device (Wireless Terminal)]

FIG. 9 is a flowchart illustrating an operation of the communication device (wireless terminal) 20a according to the second embodiment of the present technology. The following describes an operation from when the communication device (wireless terminal) 20a is powered on until when the communication device (wireless terminal) 20a starts transmitting and receiving data to and from the base station 10.

When the communication device (wireless terminal) 20a according to the second embodiment of the present technology is powered on, the communication device (wireless terminal) 20a executes synchronous cell search (step S021), and executes a cell selection procedure. In the synchronous cell search, the communication device (wireless terminal) 20a detects a synchronization signal and executes decoding of a PBCH (Physical Broadcast Channel). In this case, the communication device (wireless terminal) 20a performs, on the basis of the detection of the synchronization signal, downlink synchronization with the base station 10 in the cell. After the downstream link synchronization is established, the communication device (wireless terminal) 20a executes decoding of the PBCH.

Here, a process of transition from a state in which the communication device (wireless terminal) 20a is not coupled to any cell (idle state) to a state in which a connection is established to any cell (coupled state) is referred to as initial connection. It is to be noted that it is also regarded as the initial connection that a process of transition from a state which is not active (inactive state) although the connection to the cell is established and RRC has been completed, to the coupled state.

The communication device (wireless terminal) 20a receives, by the communication section 23, via the transceiving antenna 21, a reference signal (CRS: Cell-specific Reference Signal) to be transmitted from the base station 10 (step S023). The communication device (wireless terminal) 20a measures, by the processor 24, the reception-signal level on the basis of the reference signal CRS received by the communication section 23 (step S025). It is to be noted that the measurement is performed by the measurement section 24a and is measurement of a quality of a propagation path between the base station 10 and the communication device (wireless terminal 20a.)

The measurement section 24a of the communication device (wireless terminal) 20a measures a reference signal received power (RSRP) with respect to the reference signal CRS.

The reference signal received power RSRP is a reference signal CRS received power per single resource element. That is, the reference signal received power RSRP is an average value of the reference signal CRS received power. The reference signal CRS received power is obtained by correlation detection between a reception signal in the resource element of the reference signal CRS and the reference signal CRS which is a known signal. It is to be noted that the reference signal received power RSRP corresponds to a desired signal "S (Signal)".

Thus, the measurement section 24a of the communication device (wireless terminal) 20a is able to measure the reference received signal power RSRP as the reception-signal level with respect to the reference signal CRS.

The communication device (wireless terminal) 20a determines, by the determination section 24c, among the plurality of reception-signal-level ranges each indicating the predetermined range of the reception-signal level, the reception-signal-level range to which the measured reception-signal level belongs (step S027).

The determination section 24c of the communication device (wireless terminal) 20a refers to the level range table stored in the storage section 25 to determine the reception-signal-level range to which the measured reception-signal level (reference received signal power RSRP) belongs.

FIG. 10 illustrates the level range table indicating the ranges of the reception-signal level (reference received signal power RSRP). FIG. 10 indicates an extent to which the determination section 24c determines the receptionsignal-level range in accordance with a value of the measured reception-signal level (reference received signal power RSRP).

The determination section 24c of the communication device (wireless terminal) 20a determines that: if the measured reception-signal level (reference received signal power RSRP) is greater than or equal to L1, the reception-signal level (reference received signal power RSRP) belongs to a reception-signal-level range 1; if the measured reception-signal level (reference received signal power RSRP) is greater than or equal to L2 and less than L1, the reception-signal level (reference received signal power RSRP) belongs to a reception-signal-level range 2; if the measured reception-signal level (reference received signal power RSRP) is greater than or equal to L3 and less than L2, the reception-signal level (reference received signal power RSRP) belongs to a reception-signal-level range 3; and if the measured reception-signal level (reference received signal power RSRP) is less than L3, the reception-signal level (reference received signal power RSRP) belongs to a reception-signal-level range 4. It is to be noted that the reception-signal levels L1 to L3 are each not limited to a constant, and may each be a variable.

The communication device (wireless terminal) 20a decides, by the decision section 24b, at least one of the transmission power or the number of times of transmission for starting the random access to the base station 10, on the basis of: the reception-signal level measured by the measurement section 24a; and the difference between the gain of the receiving antenna 22 and the gain of the transmitting antenna 21a (step S029).

In this case, the decision section 24b of the communication device (wireless terminal) 20a may decide at least one of the transmission power or the number of times of transmission for starting the random access to the base station 10, on the basis of: the reception-signal-level range determined by the determination section 24c; the reception-signal level; and the difference $\Delta G_{RXA-TXA}$ between the gain of the receiving antenna 22 and the gain of the transmitting antenna 21a (step S029).

The decision section 24b of the communication device (wireless terminal) 20a refers to the number-of-times-of-transmission table stored in the storage section 25, and selects the number of times of transmission corresponding to the reception-signal-level range to which the reception-signal level measured by the measurement section 24a belongs, to thereby decide the number of times of transmission for starting the random access to the base station 10 (step S029).

FIG. 11 illustrates the number-of-times-of-transmission table stored in the storage section 25. As indicated in FIG. 11, the number of times of transmission corresponding to the reception-signal-level range is set in the number-of-times-of-transmission table.

For example, if the measured reception-signal level belongs to the reception-signal-level range 1, the decision section 24b decides that the number of times of transmission is "1". Further, if the measured reception-signal level belongs to the reception-signal-level range 2, the decision section 24b decides that the number of times of transmission is "N2". Further, if the measured reception-signal level belongs to the reception-signal-level range 3, the decision section 24b decides that the number of times of transmission is "N3". Further, if the measured reception-signal level belongs to the reception-signal-level range 4, the decision section 24b decides that the number of times of transmission is "N4". It is to be noted that the number of times of transmission values N2 to N4 are each not limited to a constant, and may each be a variable.

Further, the decision section 24b of the communication device (wireless terminal) 20a substitutes the difference $\Delta G_{RXA-TXA}$ between the gain of the receiving antenna 22 and the gain of the transmitting antenna 21a, and the attenuation PL of the transmission power transmitted from the base station 10 into Equation (2), to thereby decide the transmission power $P_{PRACHA}$.

[Equation 6]

$$P_{PRACHA} = \min\{P_{CMAX}, PRTP + PL + \Delta G_{RXA-TXA}\} \qquad (2)$$

In the second embodiment, upon calculating the transmission power $P_{PRACHA}$, not only the reception target power value PRTP at the base station 10 and the attenuation PL of the transmission power from the base station 10 to the communication device (mobile terminal) 20a are added up, but also the $\Delta G_{RXA-TXA}$ between the gain of the receiving antenna 22 and the gain of the transmitting antenna 21a is added thereto. It is thus possible to calculate the transmission power $P_{PRACHA}$ using the gain of the receiving antenna 22 and the gain of the transmitting antenna 21a.

In the second embodiment, the sum of the reception target power value PRTP at the base station 10, the attenuation PL of the transmission power from the base station 10 to the communication device (mobile terminal) 20a, and the difference $\Delta G_{RXA-TXA}$ between the gain of the receiving antenna 22 and the gain of the transmitting antenna 21a is calculated; the sum is compared with the maximum transmission power of the communication device (wireless terminal) 20a; and the smaller value thereof is determined to be the transmission power $P_{PRACHA}$.

The communication device (wireless terminal) 20a of the second embodiment is thus able to calculate the transmission power $P_{PRACHA}$ using the gain of the receiving antenna 22 and the gain of the transmitting antenna 21a, which makes it possible to avoid failing to establish a connection to the base station 10.

In this way, the decision section 24b of the communication device (wireless terminal) 20a is able to decide the transmission power and the number of times of transmission for starting the random access to the base station 10 (step S029).

Thereafter, the communication device (wireless terminal) 20a according to the second embodiment starts the random access by the random access procedure (step S031).

FIG. 12 illustrates a sequence diagram from when the communication device (wireless terminal) 20a starts the random access in accordance with the random access procedure until when the communication device (wireless terminal) 20a transmits and receives data. As described in FIG. 12, the communication device (wireless terminal) 20a starts the random access procedure on the basis of the transmission power and the number of times of transmission decided by the decision section 24b of the processor 24.

First, the communication device (wireless terminal) 20a selects a predetermined PRACH preamble, and transmits the selected PRACH preamble to the base station 10 as a message 1 (sequence Q021). Thereafter, the communication device (wireless terminal) 20a receives a RRACH response including a random access response corresponding to the PRACH preamble from the base station 10 as a message 2 (sequence Q023).

Thereafter, the communication device (wireless terminal) 20a transmits a signal including an upper layer to the base station 10 as a message 3 using a resource scheduled by a random access response grant included in the random access response (sequence 025). It is to be noted that the message 3 includes an RRC message of an RRC connection request. Thereafter, the communication device (wireless terminal) 20a receives control information for RRC connection including conflict resolution from the base station 10 as a message 4 (sequence 027). In this case, the message 4 includes an RRC message for setting up the RRC connection.

In a case where the communication device (wireless terminal) 20a receives the RRC message for setting up the RRC connection, the communication device (wireless terminal) 20a performs an RRC connection operation and transitions from an RRC idle state to an RRC coupled state. After entering the RRC coupled state, the communication device (wireless terminal) 20a transmits an RRC message of RRC connection setup completion to the base station 10. The series of operations allows the communication device (wireless terminal) 20a to be coupled to the base station 10. It is to be noted that the RRC message of RRC connection setup completion may be referred to as message 5.

After the process of the random access procedure is completed, the communication device (wireless terminal) 20a transitions to the state of being coupled to the cell (coupled state), and data transmission and reception are performed.

As described above, when transmitting the predetermined PRACH preamble to the base station 10 (sequence Q021) as the message 1, the communication device (wireless terminal) 20a according to the second embodiment of the present technology is able to start the random access to the base station 10 at the transmission power $P_{PRACH4}$ calculated by using the difference $\Delta G_{RXA\text{-}TXA}$ between the gain of the receiving antenna 22 and the gain of the transmitting antenna 21a.

As a result, the communication device (wireless terminal) 20a according to the second embodiment of the present technology is able to start the random access at the optimal transmission power when starting the random access, thereby reducing the number of times of failing to establish the connection to the base station 10 and reducing the power consumption of the user apparatus. In other words, the communication device (wireless terminal) 20a according to the second embodiment of the present technology is able to reduce a possibility of failing to perform the random access, which makes it possible to reduce the power consumed by the communication device (wireless terminal) 20a.

It is to be noted that the random access procedure is not limited to the initial connection, and is also applicable to cases of handover, uplink synchronization, uplink resource request, recovery from wireless link failure, recovery from beam link failure, and the like.

3. Third Embodiment (Example of Communication Method)

A communication method according to a third embodiment of the present technology includes: receiving, via a transceiving antenna, a reference signal to be transmitted from a base station; measuring a reception-signal level on the basis of the received reference signal; and deciding at least one of a transmission power or the number of times of transmission for starting random access to the base station, on the basis of the reception-signal level and a difference between a gain in a reception frequency band of the transceiving antenna and a gain in a transmission frequency band of the transceiving antenna.

According to the communication method of the third embodiment of the present technology, when a communication device transmits a predetermined PRACH preamble to the base station, it is possible to start the random access to the base station at the transmission power calculated by using the difference between the gain in the reception frequency band of the transceiving antenna 21 and the gain in the transmission frequency band of the transceiving antenna 21.

As a result, the communication method according to the third embodiment of the present technology is able to start the random access at the optimal transmission power when starting the random access, thereby reducing the number of times of failing to establish the connection to the base station 10 and reducing the power consumption of the user apparatus. In other words, the communication method according to the third embodiment of the present technology is able to reduce a possibility of failing to perform the random access, which makes it possible to reduce the power consumed by the communication device (wireless terminal).

Referring to FIGS. 13 to 16, the communication method performed by the communication device (wireless terminal) 20 according to the third embodiment will be described. It is to be noted that the same components as those of the first embodiment and the second embodiment are denoted by the same reference numerals, and description thereof will be omitted as appropriate.

FIG. 13 is a flowchart illustrating an operation of the communication method performed by the communication device (wireless terminal) according to the third embodiment of the present technology. The following describes the operation of the communication method from when the communication device (wireless terminal) 20 is powered on until when the communication device (wireless terminal) 20 starts transmitting and receiving data to and from the base station 10.

When the communication device (wireless terminal) 20 is powered on, the communication device (wireless terminal) 20 executes synchronous cell search (step S041), and executes a cell selection procedure. In the synchronous cell search, a synchronization signal is detected and decoding of a PBCH (Physical Broadcast Channel) is executed. In this case, the communication device (wireless terminal) 20 performs, on the basis of the detection of the synchronization signal, downlink synchronization with the base station 10 in the cell. After the downstream link synchronization is established, the communication device (wireless terminal) 20 executes decoding of the PBCH.

It is to be noted that a process of transition from a state in which the communication device (wireless terminal) 20 is not coupled to any cell (idle state) to a state in which a connection is established to any cell (coupled state) is referred to as initial connection. It is to be noted that it is also regarded as the initial connection that a process of transition from a state which is not active (inactive state) although the connection to the cell is established and RRC has been completed, to the coupled state.

The communication device (wireless terminal) 20 receives, by the communication section 23, via the transceiving antenna 21, a reference signal (CRS: Cell-specific Reference Signal) to be transmitted from the base station 10 (step S043). The communication device (wireless terminal) 20 measures, by the processor 24, the reception-signal level on the basis of the reference signal CRS received by the communication section 23 (step S045). It is to be noted that the measurement is performed by the measurement section 24a and is measurement of a quality of a propagation path between the base station 10 and the communication device (wireless terminal 20.)

The measurement section 24a of the communication device (wireless terminal) 20 measures a reference signal received power (RSRP) with respect to the reference signal CRS.

The reference signal received power RSRP is a reference signal CRS received power per single resource element. That is, the reference signal received power RSRP is an average value of the reference signal CRS received power. The reference signal CRS received power is obtained by correlation detection between a reception signal in the resource element of the reference signal CRS and the reference signal CRS which is a known signal. It is to be noted that the reference signal received power RSRP corresponds to a desired signal "S (Signal)".

Thus, the measurement section 24a of the communication device (wireless terminal) 20 is able to measure the reference received signal power RSRP as the reception-signal level with respect to the reference signal CRS.

The communication device (wireless terminal) 20 determines, by the determination section 24c, among the plurality of reception-signal-level ranges each indicating the predetermined range of the reception-signal level, the reception-signal-level range to which the measured reception-signal level belongs (step S047).

The determination section 24c of the communication device (wireless terminal) 20 refers to the level range table illustrated in FIG. 14 to determine the reception-signal-level range to which the measured reception-signal level (reference received signal power RSRP) belongs.

FIG. 14 illustrates the level range table indicating the ranges of the reception-signal level (reference received signal power RSRP). FIG. 14 indicates an extent to which the determination section 24c determines the reception-signal-level range in accordance with a value of the measured reception-signal level (reference received signal power RSRP).

The determination section 24c of the communication device (wireless terminal) 20 determines that: if the measured reception-signal level (reference received signal power RSRP) is greater than or equal to L1, the reception-signal level (reference received signal power RSRP) belongs to a reception-signal-level range 1; if the measured reception-signal level (reference received signal power RSRP) is greater than or equal to L2 and less than L1, the reception-signal level (reference received signal power RSRP) belongs to a reception-signal-level range 2; if the measured reception-signal level (reference received signal power RSRP) is greater than or equal to L3 and less than L2, the reception-signal level (reference received signal power RSRP) belongs to a reception-signal-level range 3; and if the measured reception-signal level (reference received signal power RSRP) is less than L3, the reception-signal level (reference received signal power RSRP) belongs to a reception-signal-level range 4. It is to be noted that the reception-signal levels L1 to L3 are each not limited to a constant, and may each be a variable.

The communication device (wireless terminal) 20 decides, by the decision section 24b, at least one of the transmission power or the number of times of transmission for starting the random access to the base station 10, on the basis of: the reception-signal level measured by the measurement section 24a; and the difference $\Delta G_{RX-TX}$ between the gain in the reception frequency band of the transceiving antenna 21 and the gain in the transmission frequency band of the transceiving antenna 21 (step S049).

In this case, the decision section 24b of the communication device (wireless terminal) 20 may decide at least one of the transmission power or the number of times of transmission for starting the random access to the base station 10, on the basis of: the reception-signal-level range determined by the determination section 24c; the reception-signal level; and the difference $\Delta G_{RX-TX}$ between the gain in the reception frequency band of the transceiving antenna 21 and the gain in the transmission frequency band of the transceiving antenna 21 (step S0049).

The decision section 24b of the communication device (wireless terminal) 20 refers to the number-of-times-of-transmission table stored in the storage section 25, and selects the number of times of transmission corresponding to the reception-signal-level range to which the reception-signal level measured by the measurement section 24a belongs, to thereby decide the number of times of transmission for starting the random access to the base station 10 (step S049).

FIG. 15 illustrates the number-of-times-of-transmission table stored in the storage section 25. As indicated in FIG. 15, the number of times of transmission corresponding to the reception-signal-level range is set in the number-of-times-of-transmission table.

For example, if the measured reception-signal level belongs to the reception-signal-level range 1, the decision section 24b decides that the number of times of transmission is "1". Further, if the measured reception-signal level belongs to the reception-signal-level range 2, the decision section 24b decides that the number of times of transmission is "N2". Further, if the measured reception-signal level belongs to the reception-signal-level range 3, the decision section 24b decides that the number of times of transmission is "N3". Further, if the measured reception-signal level belongs to the reception-signal-level range 4, the decision section 24b decides that the number of times of transmission is "N4". It is to be noted that the number of times of transmission values N2 to N4 are each not limited to a constant, and may each be a variable.

Further, the decision section 24b of the communication device (wireless terminal) 20 substitutes the difference $\Delta G_{RX-TX}$ between the gain in the reception frequency band of the transceiving antenna 21 and the gain in the transmission frequency band of the transceiving antenna 21, and the attenuation PL of the transmission power transmitted from the base station 10 into Equation (1), to thereby decide the transmission power $P_{PRACH}$.

[Equation 7]

$$P_{PRACH} = \min\{P_{CMAX}, PRTP + PL + \Delta G_{RX-TX}\} \quad (1)$$

In the third embodiment, upon calculating the transmission power $P_{PRACH}$, not only the reception target power value PRTP at the base station 10 and the attenuation PL of the transmission power from the base station 10 to the communication device (mobile terminal) 20 are added up, but also the difference $\Delta G_{RX-TX}$ between the gain in the reception frequency band of the transceiving antenna 21 and the gain in the transmission frequency band of the transceiving antenna 21 is added thereto. It is thus possible to calculate the transmission power $P_{PRACH}$ using the gain in the reception frequency band of the transceiving antenna 21 and the gain in the transmission frequency band of the transceiving antenna 21.

In the third embodiment, the sum of the reception target power value PRTP at the base station 10, the attenuation PL of the transmission power from the base station 10 to the communication device (mobile terminal) 20, and the difference $\Delta G_{RX-TX}$ between the gain in the reception frequency band of the transceiving antenna 21 and the gain in the transmission frequency band of the transceiving antenna 21 is calculated; the sum is compared with the maximum transmission power of the communication device (wireless terminal) 20; and the smaller value thereof is determined to be the transmission power $P_{PRACH}$.

The communication method of the third embodiment is thus able to calculate the transmission power $P_{PRACH}$ using the gain in the reception frequency band of the transceiving antenna 21 and the gain in the transmission frequency band of the transceiving antenna 21, which makes it possible to avoid failing to establish a connection to the base station 10.

In this way, the decision section 24b of the communication device (wireless terminal) 20 is able to decide the transmission power and the number of times of transmission for starting the random access to the base station 10 (step S049).

Thereafter, the communication device (wireless terminal) 20 starts the random access by the random access procedure (step S051).

FIG. 16 illustrates a sequence diagram from when the communication device (wireless terminal) 20 starts the random access in accordance with the random access procedure until when the communication device (wireless terminal) 20 transmits and receives data. As described in FIG. 16, the communication device (wireless terminal) 20 starts the random access procedure on the basis of the transmission power and the number of times of transmission decided by the decision section 24b of the processor 24.

First, the communication device (wireless terminal) 20 selects a predetermined PRACH preamble, and transmits the selected PRACH preamble to the base station 10 as a message 1 (sequence Q041). Thereafter, the communication device (wireless terminal) 20 receives a RRACH response including a random access response corresponding to the PRACH preamble from the base station 10 as a message 2 (sequence Q043).

Thereafter, the communication device (wireless terminal) 20 transmits a signal including an upper layer to the base station 10 as a message 3 using a resource scheduled by a random access response grant included in the random access response (sequence 045). It is to be noted that the message 3 includes an RRC message of an RRC connection request. Thereafter, the communication device (wireless terminal) 20 receives control information for RRC connection including conflict resolution from the base station 10 as a message 4 (sequence 047). In this case, the message 4 includes an RRC message for setting up the RRC connection.

In a case where the communication device (wireless terminal) 20 receives the RRC message for setting up the RRC connection, the communication device (wireless terminal) 20 performs an RRC connection operation and transitions from an RRC idle state to an RRC coupled state. After entering the RRC coupled state, the communication device (wireless terminal) 20 transmits an RRC message of RRC connection setup completion to the base station 10. The series of operations allows the communication device (wireless terminal) 20 to be coupled to the base station 10. It is to be noted that the RRC message of RRC connection setup completion may be referred to as message 5.

After the process of the random access procedure is completed, the communication device (wireless terminal) 20 transitions to the state of being coupled to the cell (coupled state), and data transmission and reception are performed.

As described above, when transmitting the PRACH preamble to the base station 10 (sequence Q041) as the message 1, the communication device (wireless terminal) 20 is able to start the random access to the base station 10 at the transmission power $P_{PRACH}$ calculated by using the difference $\Delta G_{RX-TX}$ between the gain in the reception frequency band of the transceiving antenna 21 and the gain in the transmission frequency band of the transceiving antenna 21.

As a result, the communication method according to the third embodiment of the present technology is able to start the random access at the optimal transmission power when starting the random access, thereby reducing the number of times of failing to establish the connection to the base station 10 and reducing the power consumption of the user apparatus. In other words, the communication method according to the third embodiment of the present technology is able to reduce a possibility of failing to perform the random access, which makes it possible to reduce the power consumed by the communication device (wireless terminal) 20.

It is to be noted that the random access procedure is not limited to the initial connection, and is also applicable to cases of handover, uplink synchronization, uplink resource request, recovery from wireless link failure, recovery from beam link failure, and the like.

It is to be noted that the communication method according to the third embodiment of the present technology is applicable to the communication system 1 described in the first embodiment. Further, the communication method according to the third embodiment of the present technology is applicable to the communication device (wireless terminal) 20a described in the second embodiment.

In this case, it is possible that the communication method according to the third embodiment of the present technology includes: receiving, via the receiving antenna 22, the reference signal to be transmitted from the base station 10; measuring the reception-signal level on the basis of the received reference signal; and deciding at least one of the transmission power and the number of times of transmission for starting the random access to the base station 10, on the basis of the reception-signal level and the difference between the gain of the receiving antenna 22 and the gain of the transmitting antenna 21a.

4. Fourth Embodiment (Example of Communication System)

A communication system according to a fourth embodiment is the communication system described in the first embodiment of the present technology to which the communication device according to the first embodiment is applied. The communication system according to the fourth embodiment of the present technology has a configuration in which the base station is described in detail as compared with the communication system described in the first embodiment.

The communication system according to the fourth embodiment of the present technology includes a first communication device and a second communication device that communicates with the first communication device. The first communication device includes a first communication section that transmits a reference signal to the second communication device. The second communication device includes a transceiving antenna, a second communication section that receives, via the transceiving antenna, the reference signal to be transmitted from the first communication section of the first communication device, a measurement section that measures a reception-signal level on the basis of the reference signal received by the second communication section, and a decision section that decides at least one of a transmission power or the number of times of transmission for starting random access to the base station, on the basis of the reception-signal level measured by the measurement section and a difference between a gain in a reception frequency band of the transceiving antenna and a gain in a transmission frequency band of the transceiving antenna.

The communication device system according to the fourth embodiment of the present technology is able to reduce a possibility that the second communication device fails to perform the random access, which makes it possible to reduce the power consumed by the second communication device (wireless terminal).

FIG. 17 illustrates a configuration example of a communication device system 1a according to the fourth embodiment of the present technology. As illustrated in FIG. 17, the communication device system 1a according to the fourth embodiment of the present technology includes a first communication device 10a, and a second communication device 20b that communicates with the first communication device 10a. It is to be noted that the same components as those of the first to third embodiments are denoted by the same reference numerals, and description thereof will be omitted as appropriate. It is also to be noted that the second communication device 20b is, for example, the communication device (mobile terminal) 20b illustrated in FIG. 1.

The first communication device 10a includes a first communication section 23a that transmits a reference signal to the second communication device 20b. The first communication device 10a corresponds to a base station.

The second communication device 20b includes: a transceiving antenna 21; a second communication section 23b that receives, via the transceiving antenna 21, the reference signal to be transmitted from the first communication section 23a of the first communication device 10a; a measurement section 24a that measures a reception-signal level on the basis of the reference signal received by the second communication section 23b; and a decision section 24b that decides at least one of a transmission power or the number of times of transmission for starting random access to the first communication device 10a, on the basis of the reception-signal level measured by the measurement section 24b and a difference between a gain in a reception frequency band of the transceiving antenna 21 and a gain in a transmission frequency band of the transceiving antenna 21. The second communication device 20b corresponds to a mobile terminal.

Further, the second communication device 20b may further include a determination section 24c. In this case, the determination section 24c determines, among a plurality of reception-signal-level ranges each indicating a predetermined range of the reception-signal level, the reception-signal-level range to which the measured reception-signal level belongs. Thus, the decision section 24b is able to decide at least one of the transmission power or the number of times of transmission for starting the random access to the first communication device 10a, on the basis of: the determined reception-signal-level range; the reception-signal level; and the difference between the gain in the reception frequency band of the transceiving antenna 21 and the gain in the transmission frequency band of the transceiving antenna 21.

In this manner, the communication device system 1a according to the fourth embodiment of the present technology is able to cause the transmission power to be calculated using the gain in the reception frequency band of the transceiving antenna 21 and the gain in the transmission frequency band of the transceiving antenna 21. The communication system 1a is thus able to start the random access at the optimal transmission power when starting the random access, thereby reducing the number of times of failing to establish the connection and reducing the power consumption of the second communication device (mobile terminal) 20b.

It is to be noted that the communication device (wireless terminal) 20a described in the second embodiment may be applied to the communication system 1a according to the fourth embodiment of the present technology.

In this case, the communication system according to the fourth embodiment of the present technology includes a first communication device 10a and a second communication device 20b that communicates with the first communication device 10a. The first communication device 10a includes a first communication section 23a that transmits a reference signal to the second communication device 20b.

The second communication device 20b may include: a transmitting antenna 21a; a receiving antenna 22; a second communication section 23b that receives, via the receiving antenna 22, the reference signal to be transmitted from the first communication section 23a of the first communication device 10a; a measurement section 24a that measures a reception-signal level on the basis of the reference signal received by the second communication section 23b; and a decision section 24b that decides at least one of a transmission power or the number of times of transmission for starting random access to the first communication device 10a, on the basis of the reception-signal level measured by the measurement section 24a and a difference between a gain of the receiving antenna 22 and a gain of the transmitting antenna 21a.

For example, in a case where the random access fails in the sequence diagram of FIG. 7, the sequence diagram of FIG. 12, and the sequence diagram of FIG. 16, the communication device (wireless terminal) 20 may increase the reception target power value PRTP of Equation (1) or the reception target power value PRTP of Equation (2) by a predetermined value. For example, in a case where the random access has failed on the first try, the communication device (wireless terminal) 20 or the communication device (wireless terminal) 20a calculates the transmission power (transmission power $P_{PRACH}$, transmission power $P_{PRACHA}$) by adding 2 dB to the reception target power PRTP, and starts the random access again. Further, for example, in a case where the random access has also failed on the second try, the communication device (wireless terminal) 20 or the communication device (wireless terminal) 20a calculates the transmission power (transmission power $P_{PRACH}$, transmission power $P_{PRACHA}$) by adding 4 dB to the reception target power PRTP, and starts the random access again.

When calculating the transmission power (transmission power $P_{PRACH}$, transmission power $P_{PRACHA}$), the difference $\Delta G_{RX-TX}$ between the gain in the reception frequency band of the transceiving antenna 21 and the gain in the transmission frequency band of the transceiving antenna 21, which has been described in the first embodiment, or the difference $\Delta G_{RXA-TXA}$ between the gain of the receiving antenna 22 and the gain of the transmitting antenna 21a, which has been described in the second embodiment, may be multiplied by a factor. Further, the difference $\Delta G_{RX-TX}$ between the gain in the reception frequency band of the transceiving antenna 21 and the gain in the transmission frequency band of the transceiving antenna 21, which has been described in the first embodiment, or the difference $\Delta G_{RXA\text{-}TXA}$ between the gain of the receiving antenna 22 and the gain of the transmitting antenna 21a, which has been described in the second embodiment may be weighted. In addition, an offset amount may be provided for the difference $\Delta G_{RX\text{-}TX}$ between the gain in the reception frequency band of the transceiving antenna 21 and the gain in the transmission frequency band of the transceiving antenna 21, which has been described in the first embodiment, or the difference $\Delta G_{RXA\text{-}TXA}$ between the gain of the receiving antenna 22 and the gain of the transmitting antenna 21a, which has been described in the second embodiment.

Further, the difference $\Delta G_{RX\text{-}TX}$ between the gain in the reception frequency band of the transceiving antenna 21 and the gain in the transmission frequency band of the transceiving antenna 21 is a fixed value when the communication device (wireless terminal) 20 receives reference signals having the same reception frequency. Here, for example, in a case where the transmission/reception frequency is changeable, the communication device (wireless terminal) 20 is able to change the difference $\Delta G_{RX\text{-}TX}$ between the gain in the reception frequency band and the gain in the transmission frequency band. Similarly, in a case where the gain of the receiving antenna 22 and the gain of the transmitting antenna 21a are each changeable, the communication device (wireless terminal) 20a is able to change the difference $\Delta G_{RXA\text{-}TXA}$.

Further, the first to fourth embodiments according to the present technology are not limited to the embodiments described herein, and various modifications may occur insofar as they are within the scope of the present technology.

Further, the effects described herein are merely illustrative and exemplary, and not limiting. The present technology may further include any effects other than those described herein.

Moreover, the present technology may have the following configurations.

[1]
A communication device including:
  a communication section that receives, via a transceiving antenna, a reference signal to be transmitted from a base station;
  a measurement section that measures a reception-signal level on a basis of the reference signal received by the communication section; and
  a decision section that decides at least one of a transmission power or a number of times of transmission for starting random access to the base station, on a basis of the reception-signal level measured by the measurement section, and a difference between a gain in a reception frequency band of the transceiving antenna and a gain in a transmission frequency band of the transceiving antenna.

[2]
The communication device according to [1], further including
  a determination section, in which
  the determination section determines, among a plurality of reception-signal-level ranges each indicating a predetermined range of the reception-signal level, the reception-signal-level range to which the measured reception-signal level belongs, and
  the decision section decides at least one of the transmission power or the number of times of transmission for starting the random access to the base station, on a basis of the reception-signal-level range that has been determined, the reception-signal level, and the difference between the gain in the reception frequency band of the transceiving antenna and the gain in the transmission frequency band of the transceiving antenna.

[3]
The communication device according to [1] or [2], in which
  the communication device operates as a directional antenna in the reception frequency band, and operates as an omnidirectional antenna in the transmission frequency band.

[4]
The communication device according to [2] or [3], further including
  a storage section, in which
  the storage section stores a number-of-times-of-transmission table,
  the number-of-times-of-transmission table has the reception-signal-level range and the number of times of transmission that are associated with each other,
  the transmission power is associated, by Equation (1) below, with the difference between the gain in the reception frequency band of the transceiving antenna and the gain in the transmission frequency band of the transceiving antenna, and an attenuation of a transmission power transmitted from the base station, and
  the decision section
    decides the number of times of transmission for starting the random access to the base station by referring to the number-of-times-of-transmission table stored in the storage section, and selecting the number of times of transmission corresponding to the reception-signal-level range to which the reception-signal level measured by the measurement section belongs, and
    decides the transmission power for starting the random access to the base station by substituting the difference between the gain in the reception frequency band of the transceiving antenna and the gain in the transmission frequency band of the transceiving antenna and the attenuation of the transmission power transmitted from the base station into Equation (1),

[Equation 1]

$$P_{PRACH} = \min\{P_{CMAX}, PRTP + PL + \Delta G_{RX\text{-}TX}\} \quad (1)$$

where $P_{CMAX}$ represents a maximum power that the communication device is transmittable, PRTP represents a reception target power value at the base station, PL represents the attenuation of the transmission power from the base station to the communication device, and $\Delta G_{RX\text{-}TX}$ represents the difference between the gain in the reception frequency band of the transceiving antenna and the gain in the transmission frequency band of the transceiving antenna.

[5]
The communication device according to any one of [1] to [4], in which the communication section starts the random access to the base station on a basis of the transmission power and the number of times of transmission decided by the decision section.

[6]
A communication device including:
  a communication section that receives, via a receiving antenna, a reference signal to be transmitted from a base station;

a measurement section that measures a reception-signal level on a basis of the reference signal received by the communication section; and a decision section that decides at least one of a transmission power or a number of times of transmission for starting random access to the base station, on a basis of the reception-signal level measured by the measurement section and a difference between a gain of the receiving antenna and a gain of a transmitting antenna.

[7]

The communication device according to [6], further including a determination section, in which the determination section determines, among a plurality of reception-signal-level ranges each indicating a predetermined range of the reception-signal level, the reception-signal-level range to which the measured reception-signal level belongs, and the decision section decides at least one of the transmission power or the number of times of transmission for starting the random access to the base station, on a basis of the reception-signal-level range that has been determined, the reception-signal level, and the difference between the gain of the receiving antenna and the gain of the transmitting antenna.

[8]

The communication device according to [6] or [7], in which the receiving antenna includes a directional antenna, and the transmitting antenna includes an omnidirectional antenna.

[9]

The communication device according to [7] or [8], further including a storage section, in which the storage section stores a number-of-times-of-transmission table, the number-of-times-of-transmission table has the reception-signal-level range and the number of times of transmission that are associated with each other, the transmission power is associated, by Equation (2) below, with the difference between the gain of the receiving antenna and the gain of the transmitting antenna, and an attenuation of a transmission power transmitted from the base station, and the decision section decides the number of times of transmission for starting the random access to the base station by referring to the number-of-times-of-transmission table stored in the storage section, and selecting the number of times of transmission corresponding to the reception-signal-level range to which the reception-signal level measured by the measurement section belongs, and decides the transmission power for starting the random access to the base station by substituting the difference between the gain of the receiving antenna and the gain of the transmitting antenna and the attenuation of the transmission power transmitted from the base station into Equation (2),

[Equation 2]

$$P_{PRACH4}=\min\{P_{CMAX}, PRTP+PL+\Delta G_{RXA\text{-}TXA}\} \quad (2)$$

where $P_{CMAX}$ represents a maximum power that the communication device is transmittable, PRTP represents a reception target power value at the base station, PL represents the attenuation of the transmission power from the base station to the communication device, and $\Delta G_{RXA\text{-}TXA}$ represents the difference between the gain of the receiving antenna and the gain of the transmitting antenna.

[10]

The communication device according to any one of [6] to [9], in which the communication section starts the random access to the base station on a basis of the transmission power and the number of times of transmission decided by the decision section.

[11]

A communication method including:

receiving, via a transceiving antenna, a reference signal to be transmitted from a base station;

measuring a reception-signal level on a basis of the reference signal that has been received; and deciding at least one of a transmission power or a number of times of transmission for starting random access to the base station, on a basis of the reception-signal level that has been measured and a difference between a gain in a reception frequency band of the transceiving antenna and a gain in a transmission frequency band of the transceiving antenna.

[12]

A communication method including:

receiving, via a receiving antenna, a reference signal to be transmitted from a base station;

measuring a reception-signal level on a basis of the reference signal that has been received; and deciding at least one of a transmission power or a number of times of transmission for starting random access to the base station, on a basis of the reception-signal level that has been measured and a difference between a gain of the receiving antenna and a gain of a transmitting antenna.

[13]

A communication system including:

a first communication device; and a second communication device that communicates with the first communication device, in which the first communication device includes a first communication section that transmits a reference signal to the second communication device, and the second communication device includes a transceiving antenna, a second communication section that receives, via the transceiving antenna, the reference signal to be transmitted from the first communication section of the first communication device, a measurement section that measures a reception-signal level on a basis of the reference signal received by the second communication section, and a decision section that decides at least one of a transmission power or a number of times of transmission for starting random access to the first communication device, on a basis of the reception-signal level measured by the measurement section and a difference between a gain in a reception frequency band of the transceiving antenna and a gain in a transmission frequency band of the transceiving antenna.

[14]
A communication system including:
a first communication device; and
a second communication device that communicates with the first communication device, in which
the first communication device includes
a first communication section that transmits a reference signal to the second communication device, and
the second communication device includes
a transmitting antenna,
a receiving antenna,
a second communication section that receives, via the receiving antenna, the reference signal to be transmitted from the first communication section of the first communication device,
a measurement section that measures a reception-signal level on a basis of the reference signal received by the second communication section, and
a decision section that decides at least one of a transmission power or a number of times of transmission for starting random access to the first communication device, on a basis of the reception-signal level measured by the measurement section and a difference between a gain of the receiving antenna and a gain of the transmitting antenna.

REFERENCE SIGNS LIST 1, 1a communication system
10 base station
20, 20a, 20b, 20c communication device (mobile terminal)
21 transceiving antenna
21a transmitting antenna
22 receiving antenna
23 communication section
24 processor
24a measurement section
24b decision section
24c determination section
25 storage section

The invention claimed is:
1. A communication device, comprising:
a communication section configured to receive, via a transceiving antenna, a reference signal from a base station;
a measurement section configured to measure a reception-signal level based on the reference signal; and
a decision section configured to:
determine, based on the reception-signal level, a number of times of transmission to start random access to the base station;
determine a sum of a reception target power value at the base station, an attenuation of a first transmission power from the base station to the communication device, and a difference between a gain in a reception frequency band of the transceiving antenna and a gain in a transmission frequency band of the transceiving antenna;
compare the sum with a maximum transmission power of the communication device; and
determine, based on the comparison, a second transmission power for the start of the random access to the base station.
2. The communication device according to claim 1, further comprising a determination section configured to determine a reception-signal-level range, corresponding to the measured reception-signal level, from a plurality of reception-signal-level ranges, wherein
each reception-signal-level range of the plurality of reception-signal-level ranges indicates a specific range of the reception-signal level, and
the decision section is further configured to determine the number of times of transmission based on the determined reception-signal-level range.
3. The communication device according to claim 2, further comprising a storage section configured to store a number-of-times-of-transmission table, wherein
the stored number-of-times-of-transmission table includes the reception-signal-level range and the number of times of transmission in association,
the second transmission power is associated, by Equation (1) below, with the difference between the gain in the reception frequency band of the transceiving antenna and the gain in the transmission frequency band of the transceiving antenna, and the attenuation of the first transmission power, and
the decision section is further configured to:
refer to the stored number-of-times-of-transmission table;
select, based on the reference to the stored number-of-times-of-transmission table, the number of times of transmission corresponding to the reception-signal-level range to which the measured reception-signal level belongs, wherein the number of times of transmission corresponding to the reception-signal-level range is selected as the number of times of transmission for the start of the random access to the base station; and
determine the second transmission power, for the start of the random access to the base station, by substitution of the difference between the gain in the reception frequency band of the transceiving antenna and the gain in the transmission frequency band of the transceiving antenna, and the attenuation of the first transmission power from the base station into Equation (1),

[Equation 1]

$$P_{PRACH} = \min\{P_{CMAX}, PRTP + PL + \Delta G_{RX-TX}\} \quad (1)$$

where $P_{CMAX}$ represents a maximum power transmittable from the communication device, PRTP represents the reception target power value at the base station, PL represents the attenuation of the first transmission power from the base station to the communication device, and $\Delta G_{RX-TX}$ represents the difference between the gain in the reception frequency band of the transceiving antenna and the gain in the transmission frequency band of the transceiving antenna.
4. The communication device according to claim 1, wherein the communication device is configured to:
operate as a directional antenna in the reception frequency band; and
operate as an omnidirectional antenna in the transmission frequency band.
5. The communication device according to claim 1, wherein the communication section is further configured to start the random access to the base station based on the second transmission power and the determined number of times of transmission.
6. A communication device, comprising:
a communication section configured to receive, via a receiving antenna, a reference signal from a base station;

a measurement section configured to measure a reception-signal level based on the reference signal; and
a decision section configured to:
    determine, based on the reception-signal level, a number of times of transmission to start random access to the base station;
    determine a sum of a reception target power value at the base station, an attenuation of a first transmission power from the base station to the communication device, and a difference between a gain of the receiving antenna and a gain of a transmitting antenna;
    compare the sum with a maximum transmission power of the communication device; and
    determine, based on the comparison, a second transmission power for the start of the random access to the base station.

7. The communication device according to claim 6, further comprising a determination section configured to determine a reception-signal-level range, corresponding to the measured reception-signal level, from a plurality of reception-signal-level ranges, wherein
    each reception-signal-level range of the plurality of reception-signal-level ranges indicates a specific range of the reception-signal level, and the decision section is further configured to determine the number of times of transmission based on the determined reception-signal-level range.

8. The communication device according to claim 7, further comprising a storage section configured to store a number-of-times-of-transmission table, wherein
    the stored number-of-times-of-transmission table includes the reception-signal-level range and the number of times of transmission in association,
    the second transmission power is associated, by Equation (2) below, with the difference between the gain of the receiving antenna and the gain of the transmitting antenna, and the attenuation of the first transmission power, and
    the decision section is further configured to:
        refer to the stored number-of-times-of-transmission table;
        select, based on the reference to the stored number-of-times-of-transmission table, the number of times of transmission corresponding to the reception-signal-level range to which the measured reception-signal level belongs, wherein the number of times of transmission corresponding to the reception-signal-level range is selected as the number of times of transmission for the start of the random access to the base station; and
        determine the second transmission power, for the start of the random access to the base station, by substitution of the difference between the gain of the receiving antenna and the gain of the transmitting antenna, and the attenuation of the first transmission power from the base station into Equation (2),

[Equation 2]

$$P_{PRACHA} = \min\{P_{CMAX}, PRTP + PL + \Delta G_{RXA\text{-}TXA}\} \quad (2)$$

where $P_{CMAX}$ represents a maximum power transmittable from the communication device, PRTP represents the reception target power value at the base station, PL represents the attenuation of the first transmission power from the base station to the communication device, and $\Delta G_{RXA\text{-}TXA}$ represents the difference between the gain of the receiving antenna and the gain of the transmitting antenna.

9. The communication device according to claim 6, wherein
    the receiving antenna includes a directional antenna, and the transmitting antenna includes an omnidirectional antenna.

10. The communication device according to claim 6, wherein the communication section is further configured to start the random access to the base station based on the second transmission power and the determined number of times of transmission.

11. A communication method, comprising:
in a communication device:
    receiving, via a transceiving antenna, a reference signal from a base station;
    measuring a reception-signal level based on the reference signal;
    determining, based on the reception-signal level, a number of times of transmission for starting random access to the base station;
    determining a sum of a reception target power value at the base station, an attenuation of a first transmission power from the base station to the communication device, and a difference between a gain in a reception frequency band of the transceiving antenna and a gain in a transmission frequency band of the transceiving antenna;
    comparing the sum with a maximum transmission power of the communication device; and
    determining, based on the comparison, a second transmission power for the starting of the random access to the base station.

12. A communication method, comprising:
in a communication device:
    receiving, via a receiving antenna, a reference signal from a base station;
    measuring a reception-signal level based on the reference signal;
    determining, based on the reception-signal level, a number of times of transmission for starting random access to the base station; and
    determine a sum of a reception target power value at the base station, an attenuation of a first transmission power from the base station to the communication device, and a difference between a gain of the receiving antenna and a gain of a transmitting antenna;
    comparing the sum with a maximum transmission power of the communication device; and
    determining, based on the comparison, a second transmission power for the starting of the random access to the base station.

13. A communication system, comprising:
a first communication device; and
a second communication device configured to communicate with the first communication device, wherein
    the first communication device includes a first communication section configured to transmit a reference signal to the second communication device, and
    the second communication device includes;
        a transceiving antenna;
        a second communication section configured to receive, via the transceiving antenna, the reference signal from the first communication section of the first communication device;
        a measurement section configured to measure a reception-signal level based on the received reference signal; and a decision section configured to:
  determine, based on the reception-signal level, a number of times of transmission to start random access to the first communication device;
  determine a sum of a reception target power value at the first communication device, an attenuation of a first transmission power from the first communication device to the second communication device, and a difference between a gain in a reception frequency band of the transceiving antenna and a gain in a transmission frequency band of the transceiving antenna;
  compare the sum with a maximum transmission power of the second communication device; and
  determine, based on the comparison, a second transmission power for the start of the random access to the first communication device.

14. A communication system, comprising:
a first communication device; and
a second communication device configured to communicate with the first communication device, wherein
  the first communication device includes a first communication section configured to transmit a reference signal to the second communication device, and
  the second communication device includes:
    a transmitting antenna;
    a receiving antenna;
    a second communication section configured to receive, via the receiving antenna, the reference signal from the first communication section of the first communication device;
    a measurement section configured to measure reception-signal level based on the received reference signal; and
    a decision section configured to:
      determine, based on the reception-signal level, a number of times of transmission to start random access to the first communication device;
      determine a sum of a reception target power value at the first communication device, an attenuation of a first transmission power from the first communication device to the second communication device, and a difference between a gain of the receiving antenna and a gain of the transmitting antenna;
      compare the sum with a maximum transmission power of the second communication device; and
      determine, based on the comparison, a second transmission power for the start of the random access to the first communication device.

* * * * *